United States Patent [19]

Cameron

[11] Patent Number: 5,689,452
[45] Date of Patent: Nov. 18, 1997

[54] METHOD AND APPARATUS FOR PERFORMING ARITHMETIC IN LARGE GALOIS FIELD GF($2^N$)

[75] Inventor: Kelly Cameron, Albuquerque, N. Mex.

[73] Assignee: University of New Mexico, Albuquerque, N. Mex.

[21] Appl. No.: 332,235

[22] Filed: Oct. 31, 1994

[51] Int. Cl.[6] .................................................. G06F 7/00
[52] U.S. Cl. .................................................. 364/746.1
[58] Field of Search ........................ 364/746.1; 371/37.1

[56] References Cited

U.S. PATENT DOCUMENTS

| | | | |
|---|---|---|---|
| 4,162,480 | 7/1979 | Berlekamp | 340/146.1 |
| 4,587,627 | 5/1986 | Omura et al. | 364/754 |
| 4,873,688 | 10/1989 | Maki et al. | 371/37.1 |

OTHER PUBLICATIONS

CCSDS *Recommendations for Telemetry Channel Coding*, CCSDS Secretariat, Communications and Data Systems Division, Code–TS, NASA, May 1984.

Advanced Hardware Architectures: AHA 4510 High Speed Reed Solomon Encoder/Decoder. Data Sheet, 1989.

E. Berlekamp, *Algebraic Coding Theory*, McGraw–Hill, New York, 1968.

R. Bose, D. Ray–Chaudhuri, "On a Class of Error Correcting Binary Group Codes," Inf. and Control, 3, pp. 68–79.

R. Blahut, *Theory and Practice of Error Control Codes*, ISBN 0–201–10102–5, Addison–Wesley, Reading, Massachusetts, 1984.

CCSDS *Recommdation for Telemetry Channel Coding*, CCSDS Secretariat, Communications and Data Systems Division, Code–TS, NASA, 1984.

R. Chien, "Cyclic Decoding Procedures for the Bose–Chaudhuri–Hocquenghem Codes," IEEE Trans. Information Theory, IT–10, pp. 357–363, Oct. 1964.

G. Clarke, J. Cain, *Error–Correction Coding for Digital Communications*, ISBM 0–306–40615–2, Plenum Press, New York, 1982.

N. Demassieux, F. Jutand, M. Muller, "A 10Mhz (255,223) Reed–Solomon Decoder," IEEE 1988 Custom Integrated Circuits Conference, pp. 17.6.1–17.6.4.

G. Feng, "A VLSI Architecture for Fast Inversion in GF($2^m$)," IEEE Trans. on Computers, vol. 38, No. 10, pp. 1383–1386, Oct. 1989.

G. Forney, *Concatenated Codes*, MTI Press, Cambridge, Massachusetts, 1966.

T. Fujio, "A Study of High–Definition TV System in the Future," IEEE Trans. Broadcast, vol. BC–24, No. 4, pp. 92–100, Dec. 1978.

A. Hillman, G. Alexanderson, *A First Graduate Course in Abstract Algebra*, Wadsworth Publishing, pp. 347–350, 1983.

"A Cellular–Array Multiplier for GF($2^m$)," IEEE Trans. on Computers, vol. C–20, pp. 1573–1578, Dec. 1971.

R. Lidl, H. Niederreiter, *Introduction of Finite Fields and their applications*, ISBN 0–521–30706–6, Cambridge University Press, Cambridge, 1986.

F. Mac Williams, N. Sloane, *The Theory of Error–Correcting Codes*, ISBN 0–444–85010–4, New York: North–Holland, 1977.

R. McEliece, *Finite Fields for Computer Scientist and Engineers*, ISBN 0–898–38191–6, Kluwer Academic Publishers, Norwell, Massachusetts, 1987.

(List continued on next page.)

*Primary Examiner*—Tan V. Mai
*Attorney, Agent, or Firm*—Haverstock & Associates

[57] ABSTRACT

A method and apparatus for decoding Reed-Solomon codes in large Galois Fields GF($2^n$) represents the finite field as a quadratic extension field of one or more subfields GF($2^m$). This type of field representation allows embedded subfields, as well as the primary extension field to be simultaneously represented in normal form. The basic arithmetic operations for the extension field are written solely in terms of operations performed in one or more subfields. The operations of multiplication, inverse, square, square root and conjugation are performed in GF($2^n$), utilizing only operations from the subfield GF($2^m$).

41 Claims, 16 Drawing Sheets

OTHER PUBLICATIONS

G. Meeker, "High Definition and High Frame Rate Compatible N.T.S.C. Broadcast Television System," IEEE Trans. Broadcast, vol. 34, No. 3, pp. 313–322, Sep. 1988.

B. Mortimer, M. Moore, M. Sablatash, "Performance of a Powerful Error–Correcting and Detecting Coding Scheme for the North American Basic Teletext System (NABTS) for Random Independent Errors: Methods, Equations, Calculations, and Results," IEEE Trans. Broadcast, vol. 36, No. 2, pp. 113–131, Jun. 1990.

I. Reed, G. Solomon, "Polynomial Codes over Certain Finite Fields," J. Soc. Industrial Applied Mathematics, 8, pp. 300–304.

H. Shao, I. Reed, "On the VLSI Design of a Pipeline Reed–Solomon Decoder Using Systolic Arrays," IEEE Transactions on Computers, vol. 37, No. 10, Oct. 1988, pp. 1273–1280.

Y. Sugiyama, M. Kasahara, S. Hirasawa, T. Namekawa, "A Method for Solving Key Equation for Decoding Goppa Codes," Inf. Control, 27, pp. 87–99, 1975.

C. Wang, T. Truong, H. Shao, L. Deutsch, J. Omura, "VLSI Architectures for Computing Multiplications and Inverses in $GF(2^m)$," IEEE Transactions on Computers, vol. C–34, No. 8, pp. 709–711, Aug. 1985.

S. Whitaker, K. Cameron, G. Maki, J. Canaris, P. Owlsey, "Custom CMOS Reed–Solomon Coder for the Hubble Space Telescope," Proceedings of the IEEE Military Communications Conference, Monterey, CA, pp. 4.3.1–4.3.5, Oct. 1990.

S. Whitaker, J, Canaris, K. Cameron, "Reed–Solomon VLSI Codec for Advanced Television", IEEE Transactions on Circuits and Systems for Video Technology, pp. 1–21, Jun. 1991.

C. Yeh, I. Reed, T. Truong, "Systolic Multipliers for Finite Fields $GF(2^m)$", IEEE Transactions on Computers, vol. C–33, pp. 357–360, Apr. 1984.

Digital Spectrum Compatible, Technical Description, Zenith Electronic Corporation and AT&T, Feb. 22, 1991.

K. Niwa, T. Araseki, T. Nishitani, "Digital Signal Processing for Video," IEEE Circuits and Devices Magazine, vol. 6, No. 1, pp. 27–32, Jan. 1990.

Figure 1: Multiplication Circuit for GF($2^4$)

METHOD AND APPARATUS FOR PERFORMING ARITHMETIC IN LARGE GALOIS FIELD GF($2^N$)

FIELD OF THE INVENTION

This invention relates to the field of error correction in data. More particularly, the present invention relates to the field of error correction in data for digital communications using a Reed-Solomon type decoder.

BACKGROUND OF THE INVENTION

The use of Reed-Solomon (BCH) codes in various error control applications is becoming widespread. Uses range from relatively low performance applications, such as Compact Disks and CD ROMS, to high performance applications such as tape drives. Reed-Solomon codes are also used to ensure data integrity in magnetic and optical disk drive systems. Several proposed standards for HDTV (High Definition Television) also call for the use of Reed-Solomon codes to improve performance under poor signal conditions. High performance (15 Mbyte/s) Reed-Solomon codes are commercially available and the world-wide standard for near earth space telemetry transmissions (CCSDS) employs such codes.

Reed-Solomon codes are algebraic block codes, defined in terms of Galois or finite field arithmetic. Both the information and the redundancy portions of such codes are viewed as consisting of elements taken from some particular Galois field. A Galois field is commonly identified by the number of elements which it contains. The elements of a Galois field may be represented as polynomials in a particular primitive field element, with coefficients in the prime subfield. The location of errors and the true value of the erroneous information elements are determined after constructing certain polynomials defined on the Galois field and finding the roots of these polynomials. Since the number of elements contained in a Galois field is always equal to a prime number, q, raised to a positive integer power, m, the notation, GF($q^m$) is commonly used to refer to the finite field containing $q^m$ elements. In such a field all operations between elements comprising the field, yield results which are each elements of the field.

Though Reed-Solomon codes may be defined over any Galois field, a common choice is the use of GF($2^8$). This is usually a convenient choice since each symbol in this field may be viewed as an eight bit byte. Though efficient algorithms and corresponding circuits for performing basic Galois field arithmetic are known, many of these techniques either become very slow or else require an inordinate amount of circuitry to implement when the size of the Galois field becomes much larger than GF($2^8$). Consequently, most available Reed-Solomon decoders are built using small fields, no larger than GF($2^8$) or GF($2^{10}$).

TRADITIONAL IMPLEMENTATIONS

Regardless of the size of the field, addition in GF($2^n$) can be implemented quite easily, by a bitwise Exclusive OR of the elements to be added, i.e., addition modulo 2. Arithmetically, this addition is implemented without a carry, yielding the binary results 0+1=1+0=1 and 0+0=1+1=0. The absence of a carry limits the magnitude of the resulting sum to the finite field.

A. Multiplication

Multiplication in GF($2^n$) is not as simple to implement as addition. The multiplicative structure of a finite field can be determined from the primitive polynomial used to create the normal representation of the field. Utilizing a primitive polynomial, a person having skill in the art can generate a logarithm table to be used for performing multiplication. The manner in which such log tables are created is well known and is widely described in the literature.

Given such a log table, any two non-zero elements A and B may be multiplied using the following equation:

$$C=AB=\log^{-1}[\log(A)+\log(B) \pmod{2^n-1}] \qquad (1)$$

where $\log^{-1}$ is the inverse of the log function. Though this approach to multiplication works quite well in software, as long as the size of the field is not too large, it tends to be bulky when implemented in hardware, even for fields as small as GF($2^8$). The inherent problem is that the amount of data stored in the tables grows faster than exponentially with the number of bits in the field. For a finite field GF($2^n$), $2n2^n$ bits are required for the log and $\log^{-1}$ tables.

It is therefore desirable to construct circuits or algorithms which actually calculate the product of two numbers without the aid of lookup tables. Several successful approaches have been pursued in this regard. The first circuit devised for multiplying two general field elements is attributed to Elwyn Berlekamp, the author of the book *Algebraic Coding Theory*, published by McGraw-Hill, and is described in U.S. Pat. No. 4,162,480 issued on Jul. 24, 1979. It is a bit serial circuit which requires n clock cycles to perform a multiplication.

The first parallel implementation of a finite field multiplier known to the inventor was developed by Yeh et al., "Systolic Multipliers for Finite Fields GF($2^m$)", IEEE Transactions on Computers, 1984; Massey et al., "Computational Method and Apparatus for Finite Field Arithmetic", U.S. Pat. No. 4,587,627; and Omura et at., "VLSI Architecture for Computing Multiplications and Inverses in GF($2^m$)", IEEE Transactions on Computers, 1985. Though these implementations manage to make the circuitry for calculating each bit of the product identical, with simply a permutation of the inputs to the circuit, the implementation of the actual multiplier circuit is quite irregular and not easily implemented in VLSI. Due to its irregularity, the area required to implement this type of adder as a function of n is not easily ascertained, nor are the propagation delay characteristics of the circuit easy to determine.

Another implementation of a parallel finite field multiplier is described in U.S. Pat. No. 4,873,688, issued on Oct. 10, 1989 to Maki et al. This implementation is very closely related to a traditional integer multiplier, with the terms corresponding to powers of α greater than or equal to n being equated to sums of lower powers of α, in accordance with the defining primitive polynomial. Such a circuit is shown in FIG. 1 for the Galois field defined by p(x)=$x^4$+x+1.

This implementation, being regular in structure, is easily analyzed, both in terms of circuit area required to implement, as well as speed of performance. The area required to implement this design is proportional to $n^2$. This is the best implementation, area-wise, known to the inventor. Propagation delay for this circuit, however, grows proportional to n.

B. Division

The task of dividing two numbers in a finite field is not straightforward. The usual algorithm for dividing integers does not generalize to a finite field. Division in a finite field is often accomplished with log and $\log^{-1}$ tables or inverse tables. These methods permit inverses to be found quite rapidly, but suffer from the same problem that log table multiplication has, namely the amount of information required to implement these schemes grows proportional to $n2^n$. However, inverse table lookup may very well be the method of choice for hardware implementation of division for smaller, eight to ten bit, fields.

A well-known method for calculating inverses in a finite field exists. It follows directly from the cyclic structure of such a field that the inverse of a field element can be obtained directly from exponentiation. To be more precise:

$$a^{-1} = a^{2^n - 2} \qquad (2)$$

A person skilled in the art will recognize that this operation can be accomplished with $2n-3$ multiplications.

SUMMARY OF THE INVENTION

A method and apparatus for decoding Reed-Solomon codes in large Galois Fields $GF(2^n)$ represents the finite field as a quadratic extension field of one or more subfields $GF(2^m)$. This type of field representation allows embedded subfields, as well as the primary extension field to be simultaneously represented in normal form. The basic arithmetic operations for the extension field are written solely in terms of operations performed in one or more subfields. The operations of multiplication, inverse, square, square root and conjugation are performed in $GF(2^n)$, utilizing only operations from the subfield $GF(2^m)$.

DETAILED DESCRIPTION OF THE PREFERRED EMBODIMENT

CONSTITUENT SUBFIELDS

Figure 1:
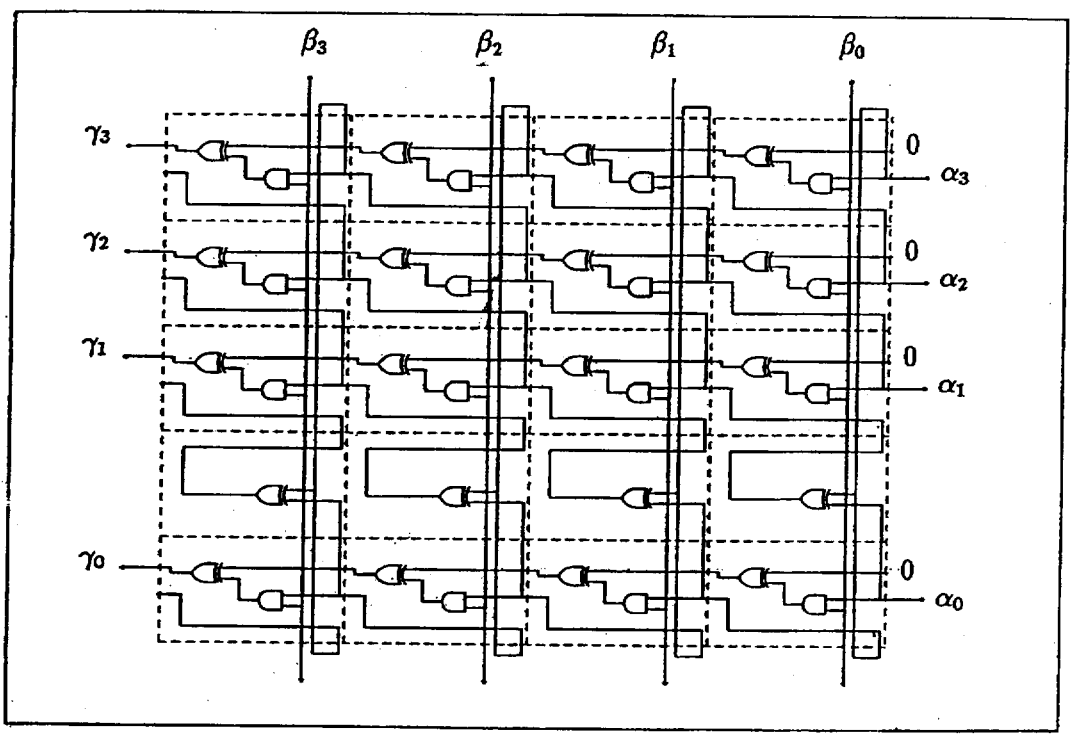
FIG. 1 illustrates a prior art schematic diagram of a circuit for implementing a Galois field multiplier.

A basic characteristic shared by all of the "traditional" procedures for performing arithmetic in a finite field is that they operate by combining operations defined in $GF(2)$ arithmetic. As will be shown, this may not always be an optimal approach.

Though typically defined in terms of a primitive polynomial, there are actually several alternate, though closely related, ways of defining the multiplicative structure of a finite field. The present invention includes an alternate method for determining the multiplicative structure of the finite field by defining it in terms of multiple primitive polynomials. The method of the present invention may only be applied to finite fields where n is a composite number, however.

The method is implemented by first letting n, the number of bits in the field, be a composite number such that $\Pi p_i = n$, where $p_i$ can be any set of factors of n. The $p_i$ values may be repeated, if necessary. The multiplicative structure of the field may be determined by i primitive polynomials, $F_i$, where $\deg(F_i) = p_i$. Though one typically thinks of $GF(2^n)$ as the $n^{th}$ extension field of $GF(2)$, it may also be viewed as the $p_i^{th}$ extension field of some subfield of $GF(2^n)$.

A primitive polynomial over the finite field $GF(2)$, $F_1$, is used to define a representation of the $p_1^{th}$ extension field of the finite field $GF(2)$. $F_2$, a primitive polynomial in $GF(2^{p_1})$, is used to define a representation of a $p_2^{th}$ extension field of $GF(2^{p_1})$. This procedure may be continued with all factors, $p_i$, of n, until the desired finite field is constructed.

As an example, if $n=16$, $p_1=8$, and $p_2=2$, then a representation of the finite field $GF(2^{16})$ may be defined in terms of the primitive polynomials, $F_1 = x^8 + x^5 + x^3 + x + 1$, a primitive polynomial over $GF(2)$, and $F_2 = x^2 + x + 149$, a primitive polynomial over $GF(2^8)$.

The advantage of constructing the finite field from one or more of its subfields lies in the fact that the structure of these subfields remains accessible to direct manipulation when this type of construction is used. Furthermore, operations defined in $GF(2^n)$ may be directly calculated in terms of operations performed in one or more of the constituent subfields.

Though the above discussion refers only to fields of characteristic 2, the same principles may be applied to finite fields of any characteristic.

BASIC OPERATIONS

Attention will now be focused on the implications of representing a finite field, $GF(2^n)$, as a quadratic extension of a smaller field. This, of course, limits the discussion to finite fields where n is an even number. It will be demonstrated that the operations of multiplication, inverse, square, square root and conjugation may be performed in $GF(2^n)$, utilizing only operations from the subfield $GF(2^m)$, according to the present invention.

A. Multiplication

For the following description of the present invention, $GF(2^m)$ will represent a subfield, and $GF(2^n)$ will represent a quadratic extension field constructed from the subfield $GF(2^m)$, with the primitive polynomial, F, having a form of $$x^2 + x + \beta = 0 \qquad (3)$$

where $\beta$ is an element from the subfield $GF(2^m)$. Though the above choice for the form of F is admittedly arbitrary, it is in no way restrictive. An arbitrary quadratic primitive polynomial, $Ay^2 + By + C = 0$, may be converted to the form specified for the primitive polynomial F by the linear transformation $y = Bx/A$.

Now, by choosing $\alpha$ to be a primitive root of F, we have the following relationship expressed in equation (4), which will be used to define the multiplicative structure of the quadratic extension field, $GF(2^n)$.

$$\alpha^2 = \alpha + \beta \tag{4}$$

The values $\alpha^0$ and $\alpha^1$ are the basis vectors for constructing the quadratic extension field, $GF(2^n)$. Furthermore, the values $\alpha A+B$ and $\alpha C+D$ are arbitrary elements from $GF(2^n)$. Therefore, performing symbolic multiplication on these quantities yields:

$$(\alpha A+B)(\alpha C+D) = BD+(AD+BC)\alpha+AC\,\alpha^2 \tag{5}$$

Applying the identity defined in equation 4, the right hand side of equation 5 can be rewritten as follows:

$$(\alpha A+B)(\alpha C+D) = \alpha(AD+BC+AC)+(BD+AC\beta) = \alpha X+Y \tag{6}$$

The representation expressed in equation (6) forms the definition of multiplication in $GF(2^n)$ in terms of operations taken solely from the subfield $GF(2^m)$. This expression is very similar to the manner in which multiplication in the complex plain is defined in terms of real number multiplication and addition. Indeed, from a comparative standpoint, $\alpha$ serves the same purpose in $GF(2^n)$ as $i=\sqrt{-1}$ serves in the complex plane.

It should be noted that for the special case when $A=0$ and $C=0$, equation 6 simplifies to: $(0\alpha+B)(0\alpha+D)=BD+0\alpha$. It follows directly from this observation that the subfield $GF(2^m)$ shows up explicitly in this representation of $GF(2^n)$ and corresponds to those elements of $GF(2^n)$ where the $\alpha$ term is equal to zero. It should also be noted that the multiplication of an element from $GF(2^n)$ by an element of $GF(2^m)$ is also easily accomplished as demonstrated in the following equation:

$$(\alpha A+B)D = BD+\alpha AD \tag{7}$$

B. Division and Inverses

An expression for the results of the division of one element by another in $GF(2^n)$ can be developed from equation (6) which is the defining equation for multiplication. If $(\alpha A+B)(X\alpha+Y)=(\alpha C+D)$, then by applying equation 6 and solving for $X$ and $Y$, the following expression can be obtained:

$$\frac{\alpha C+D}{\alpha A+B} = \frac{(BD+AD+AC\beta)+\alpha(BC+AD)}{B^2+AB+\beta A^2} \tag{8}$$

If one substitutes unity for the numerator of the left hand side of this equation, an expression, represented in equation (9) for the multiplicative inverse of an element in $GF(2^n)$, is obtained which utilizes only operations from the subfield $GF(2^m)$.

$$\frac{1}{\alpha A+B} = \frac{(A+B)+\alpha A}{B^2+AB+\beta A^2} \tag{9}$$

C. Squares and Square Roots

Applying the basic expression for multiplication, represented in equation (6), the square of a number can be obtained by the following equation:

$$(\alpha A+B)^2 = (B^2+\beta A^2)+\alpha A^2 \tag{10}$$

Solving for the inverse relationship, yields an expression for the square root of a field element of $GF(2^n)$ in terms of only subfield operations:

$$\sqrt{\alpha A+B} = \sqrt{B+\beta A} + \alpha\sqrt{A} \tag{11}$$

D. Conjugates

The calculation of the conjugate $Z^*$ of an arbitrary element in $GF(2^n)$, $Z$, with respect to the subfield $GF(2^m)$ follows directly from equation (10), since it has been demonstrated by R. Lidl and R. Niederreiter in the book *Introduction to Finite Fields and Their Applications* published by Cambridge University Press, that $Z^*=Z^{2^m}$. In particular, if $Z=\alpha A+B$, then repeating the application of equation 10 m times yields:

$$Z^* = (\alpha A+B)^{2^m} = \alpha A^{2^m} + B^{2^m} + A^{2^m}\sum_{i=0}^{m-1}\beta^{2^i} \tag{12}$$

This expression can be further simplified if one observes that $A^{2^m}=A$ and $B^{2^m}=B$, because these operations are performed in $GF(2^m)$. Furthermore, the summation of powers of $\beta$ is equal to the trace of $\beta$ in $GF(2^m)$ as also demonstrated by Lidl and Niederreiter. R. McEliece in the book *Finite Fields for Computer Scientists and Engineers* published by Kluwer Academic Publishers, demonstrated that equation (3) has no roots in $GF(2^m)$. Therefore, the trace of $\beta$ must equal unity. Consequently, the expression for the conjugate of A may be expressed as:

$$Z^* = (\alpha A+B)^{2^m} = (A+B)+\alpha A \tag{13}$$

It should be clear that this is a bi-directional mapping and holds for any element in $GF(2^n)$.

Though the illustration of the present invention has only applied to quadratic extension fields, the results obtained may be recursively applied to smaller and smaller subfields, up to the number of factors of 2 contained in n. It should also be noted that similar equations may be developed for other extension fields that are not quadratic, though the final relationships will, in general, be more complicated.

COMPUTATIONAL EFFICIENCY

Computational efficiency is evaluated on the basis of the number and type of operations that need to be performed as well as the area (very roughly) required to implement the corresponding circuits.

A. Multiplication

The operations represented by equation (6), the defining multiplication equation, can be re-arranged so as to require only 3 actual, general subfield multiplications, a number of additions, and two constant multiplications. In particular, if: $X=(B+\beta A)$, $Y=(C+D)B$, and $Z=[(1+\beta)C+D]A$ then:

$$(\alpha A+B)(\alpha C+D)=(X+Y)+\alpha(X+Z) \tag{14}$$

If only the number of general $GF(2^m)$ multiplications required were taken into account when calculating the circuit area to implement such a circuit, one would conclude that the area of the circuit grows proportional to $n^{1.585}$, which is considerably better than the $n^2$ figure for the "traditional" implementation described previously. This, however, is an overly simplistic approach, which does not account for the decrease in regularity of both circuit formation and data flow, and the not insignificant number of "simple" operations that must also be performed. When these items are taken into account, it is anticipated that the actual area required to implement a multiplier according to the present invention is approximately the same as required for the "traditional" multiplier.

The propagation delay characteristics of a multiplier built according to the present invention are considerably better than the "traditional" multiplier, however. Recursively applying equation (6) to construct the multiplier, a propagation delay proportional to log n is attainable. One may also select the defining primitive polynomials in such a manner as to simplify the constant multipliers required. The inventor utilized an exhaustive computer search to arrive at the choice of primitive polynomials listed above.

B. Inverse

As stated above, a straightforward analysis of equation (9) indicates that this expression for the inverse of a field element can be performed using $2n-3$ $GF(2^n)$ multiplications. Wang et al. in "VLSI Architectures for Computing Multiplications and Inverses in $GF(2^m)$", IEEE Transactions on Computers, vol. C-34, no. 8, pp. 709–717, August 1985, propose a solution whereby $n-1$ of these general multiplications may be replaced by a simple linear transform.

According to the method of the present invention, the expression for the calculation of the inverse of a field element based upon the structure of the quadratic extension field, equation (9), can be calculated using only order $\log n$ operations, all of which are taken, not from $GF(2^n)$, but rather from a subfield. It should be noted, however, that the number of operations at each recursive step is larger than required for the traditional, linear approach. For sufficiently large n, the order $\log n$ algorithm will always be faster, but at what point it becomes faster is a function of the relative cost of the different constituent operations.

C. Square and Square Root

Using the "traditional" matrix approach described above, both the square and square root operations can be performed with an $n \times n$ by n matrix multiplication. This is, of course, an $n^2$ process. A typical hardware implementation of a Reed-Solomon decoder such as disclosed in U.S. Pat. No. 4,873,688 to Maki et al., however requires $n^2$ area and operates in linear time. The same may be said of the general multiplier, which can, alternatively, be used to implement the square function.

It should be mentioned that multiplying a finite field element by a constant is much simpler than general multiplication of two arbitrary field elements. It corresponds to a linear operation wherein a $GF(2)$ n by n matrix is multiplied by an n bit vector. Such operations are easily and efficiently performed. Though not as obvious, both the square and the square root operations are linear operators in any field of characteristic 2. They can be computed with similar matrix operations.

The asymptotic complexity of the quadratic extension field equation is also $n^2$, when viewed as consisting of $GF(2)$ operations. The time complexity to implement a purely recursive solution to these equations is also linear with respect to n. Significant execution speed advantages, at least for the calculation of the square root function, are possible in some instances, if equation (11) is combined with table lookup, in some smaller sub-field.

CUBE ROOT

The computation of cube roots in $GF(2^n)$ utilizing only operations from the quadratic subfield is much more involved. A procedure will be briefly described, mostly for completeness sake. First, an expression for the cube of a number can be represented by the following equation:

$$(x\alpha+y)^3=[(\beta+1)x^3+xy^2+x^2y]\alpha+(\beta x^2y+y^3+\beta x^3)=(c\alpha+d) \quad (15)$$

Separating the unity and $\alpha$ terms into separate equations, solving the equations for x, and then substituting $u=d/c$ and $z=x^3/c$, yields the following equation, which can be solved for z by any of a number of different methods.

$$z^3+z^2+(u^2+u+\beta+1)z+1=0 \quad (16)$$

Given values for x, corresponding values of y can be found by solving the following equation, which is constructed by equating the $\alpha$ terms of equation 15.

$$xy^2+x^2y+(\beta+1)x^3+c=0 \quad (17)$$

Equations (16) and (17) typically generate spurious solutions. The correct solutions may be determined by substituting back into equation (15).

LOGARITHMS

The ability to compute discrete logarithms quickly and efficiently is of great advantage in performing finite field arithmetic. Unfortunately, this is a task which, in general, is not readily accomplished, in spite of significant advances in recent years as evidenced by R. Lidl and H. Neiderreiter, in their book *Introduction to Finite Fields and Their Applications*, published by Cambridge University Press. A partial solution can be obtained quite efficiently, however, in terms of the quadratic subfield.

It should be clear to a person skilled in the art that raising any element of $GF(2^n)$ to the $2^m+1$ power, will map that element into the quadratic subfield. Due, to the representation of $GF(2^n)$, however, this is guaranteed to be an m bit quantity:

$$(\alpha x_1+x_0)^{2^m+1}=0\alpha+x_1x_0+x^2_0+\beta x^2_1 \quad (18)$$

The logarithm of this value can be looked up in a $GF(2^m)$ logarithm table, and when divided by $2^m+1$, it yields the logarithm of the original number, modulo $2^m-1$.

HARDWARE

Figure 2:
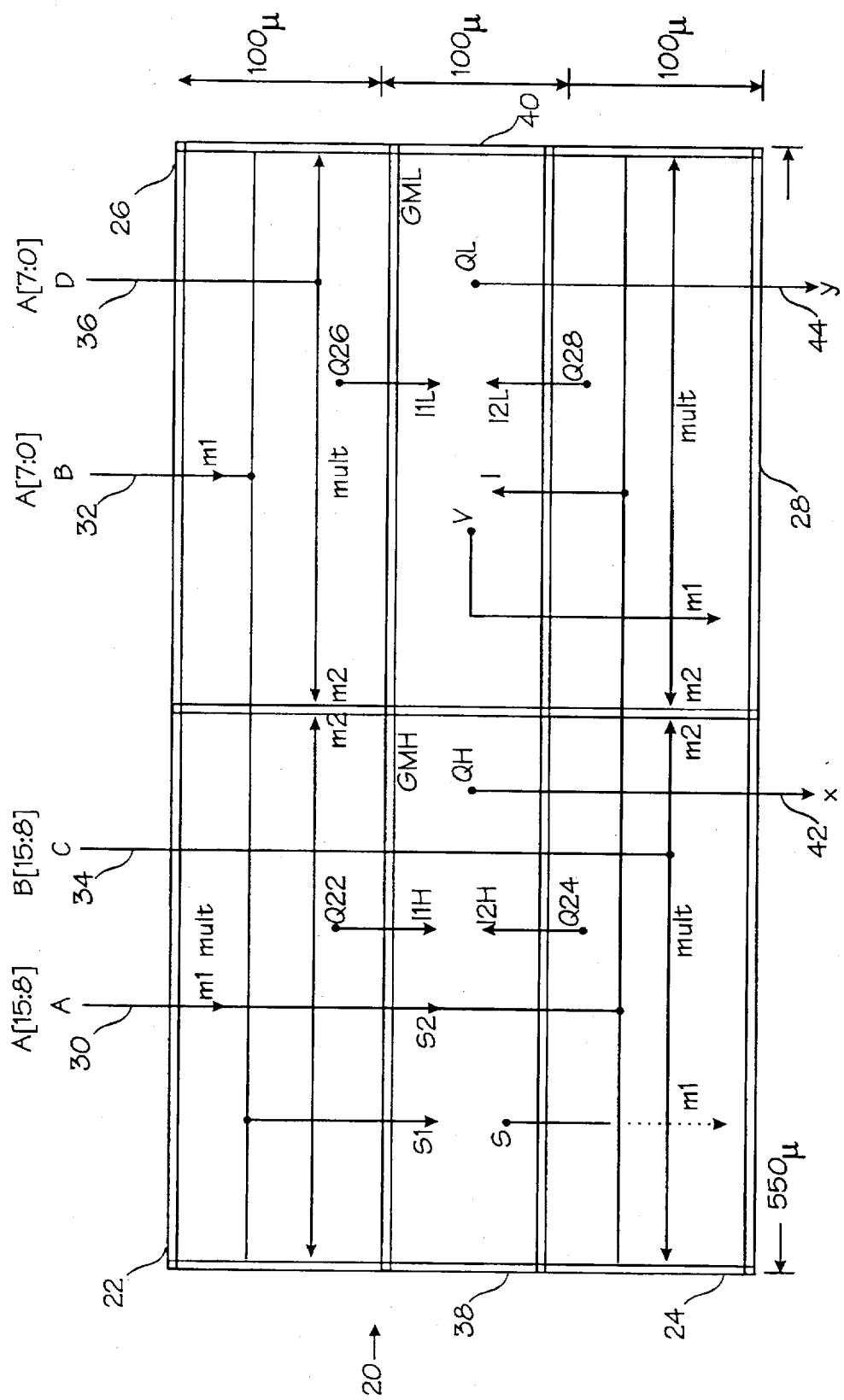
FIG. 2 illustrates a general multiplier wiring diagram corresponding to the present invention.

A wiring diagram of a general multiplier according to the defining equation (6) of the present invention is illustrated in FIG. 2. The general multiplier 20 of FIG. 2 includes four multiplier blocks 22, 24, 26 and 28 into which the inputs A, B, C and D are input on the respective signal lines 30, 32, 34 and 36, a general multiplier high (GMH) block 38 out of which the output X is output on the signal line 42 and a general multiplier low (GML) block 40 out of which the output Y is output on the signal line 44.

In order to implement the equation (6) each of the multiplier blocks 22, 24, 26 and 28 multiplies two values m1 and m2 and the result is then input into either the GMH 38 or GML 40 blocks. Within the GMH 38 and GML 40 blocks, other arithmetic operations are performed and the results combined to achieve the output values X and Y.

Specifically, in the multiplier block 22 the A input signal line 30 is designated as m1 and is multiplied with the D input signal line 36 which is designated as m2. The result of this multiplication Q22 is input into the GMH block 38 as the input I1H. To obtain the value m1 for the multiplier block 24, the quantities S1 and S2 must first be added together in the GMH block 38. The quantity S1 is taken from the B input signal line 32 and the quantity S2 is taken from the A input signal line 30. To obtain the quantity S, the quantities S1 and S2 are added together in the GMH block 38 which results in the quantity S being equal to (A+B). The quantity S is then input into the multiplier block 24 as the multiplicand m1 and is multiplied with the C input signal line 34, which is designated as m2. The result of this multiplication Q24 is input into the GMH block 38 as the input I2H. To obtain the result QH of the operations performed on the left-hand or high side of the general multiplier 20, the quantities I1H and I2H are added together yielding the value [AD+(A+B)C], which is then output as the value X on the signal line 42.

In the multiplier block 26 the B input signal line 32 is designated as m1 and is multiplied with the D input signal line 36 which is designated as m2. The result of this multiplication Q26 is input into the GML block 40 as the input I1L. To obtain the value m1 for the multiplier block 28, the input I, taken from the A input signal line 30, is multiplied by the constant $\beta$ and the result V is input into the multiplier block 28 as the multiplicand m1. The value A$\beta$ is then multiplied with the C input signal line 34, designated as m2 and the result of this multiplication Q28 is input into the GML block 40 as the input I2L. To obtain the result QL of the operations performed on the right-hand or low side of the general multiplier 20, the quantities I1L and I2L are added together yielding the value [BD+βAC], which is then output as the value Y on the signal line 44.

Figure 3:
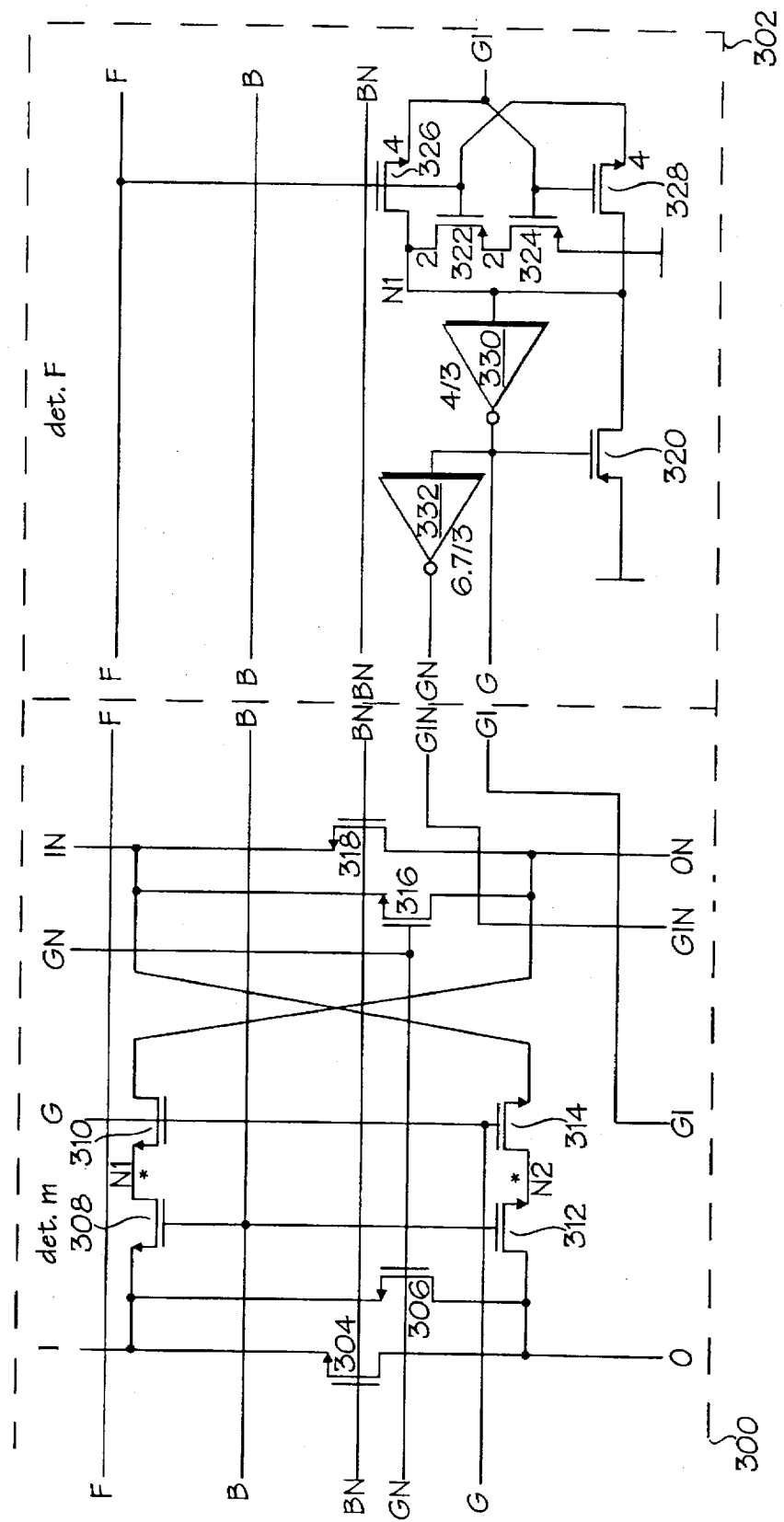
FIG. 3 illustrates a detailed schematic diagram of the fundamental blocks M and F.

The A, B, C and D input signal lines 30, 32, 34 and 36 are each eight-bit signal lines as they are input into the general multiplier 20. It will be apparent to one of ordinary skill in the art that there are multiple ways to implement a general multiplier 20 according to the present invention. The preferred embodiment for the implementation of the general multiplier 20 of the present invention is illustrated in the detailed schematics of FIGS. 3–13. In the preferred embodiment of the present invention the A, B, C and D input signal lines 30, 32, 34 and 36 are coupled to the general multiplier 20 by two sixteen bit signal lines A and B. The bits 0–7 of the signal line A represent the B input signal line 32. The bits 8–15 of the signal line A represent the A input signal line 30. The bits 0–7 of the signal line B represent the D input signal line 36. The bits 8–15 of the signal line B represent the C input signal line FIG. 3 illustrates detailed schematics of the fundamental blocks M and F which are used to build sections of the general multiplier 20 as will be discussed shortly. The block M 300 is illustrated in detail in FIG. 3. The B signal line and its inverse, the BN signal line, are coupled to the block M 300. The G signal line and its inverse, the GN signal line, are coupled to the block M 300. The GI signal line and its inverse, the GIN signal line, are coupled to the block M 300. The O signal line and its inverse, the ON signal line, are also coupled to the block M 300. The I signal line and its inverse, the IN signal line, are also coupled to the block M 300. The F signal line is also coupled to the block M 300.

Transistors 304, 306, 308, 310, 312, 314, 316 and 318 are all depletion-type n-channel MOSFETs each having a gate, a drain and a source. The B signal line is coupled to the gate of the transistor 308 and to the gate of the transistor 312. The BN signal line is coupled to the gate of the transistor 304 and to the gate of the transistor 318. The signal line G is coupled to the gate of the transistor 310 and to the gate of the transistor 314. The signal line GN is coupled to the gate of the transistor 306 and to the gate of the transistor 316. The signal line I is coupled to the source of the transistor 304, to the source of the transistor 306 and to the source of the transistor 308. The signal line IN is coupled to the source of the transistor 314, to the source of the transistor 316 and to the source of the transistor 318. The signal line O is coupled to the drain of the transistor 304, to the drain of the transistor 306 and to the drain of the transistor 312. The signal line ON is coupled to the drain of the transistor 310, to the drain of the transistor 316 and to the drain of the transistor 318. The drain of the transistor 308 is coupled to the source of the transistor 310. The source of the transistor 312 is coupled to the drain of the transistor 314.

A detailed schematic of the block F 302 is also illustrated in detail in FIG. 3. As shown the blocks M and F are designed to share horizontal inputs and outputs when the blocks are coupled together. The signal line B and its inverse, the signal line BN, are coupled to the block F 302. The signal line G and its inverse, the signal line GN, are coupled to the block F 302. The signal line F and the signal line GI are also coupled to the block F 302.

The signal line F is coupled to the gate of the transistor 326, to the gate of the transistor 322 and to the source of the transistor 328. The signal GI is coupled to the source of the transistor 326, to the gate of the transistor 324 and to the gate of the transistor 328. The drain of the transistor 326 is coupled to the drain of the transistor 322, to the input of the inverter 330, to the drain of the transistor 328 and to the drain of the transistor 320. The source of the transistor 322 is coupled to the drain of the transistor 324. The source of the transistor 324 is coupled to ground. The source of the transistor 320 is also coupled to ground. The G signal line is coupled to the gate of the transistor 320, to the output of the inverter 330 and to the input of the inverter 332. The signal line GN is coupled to the output of the inverter 332.

Figure 4:
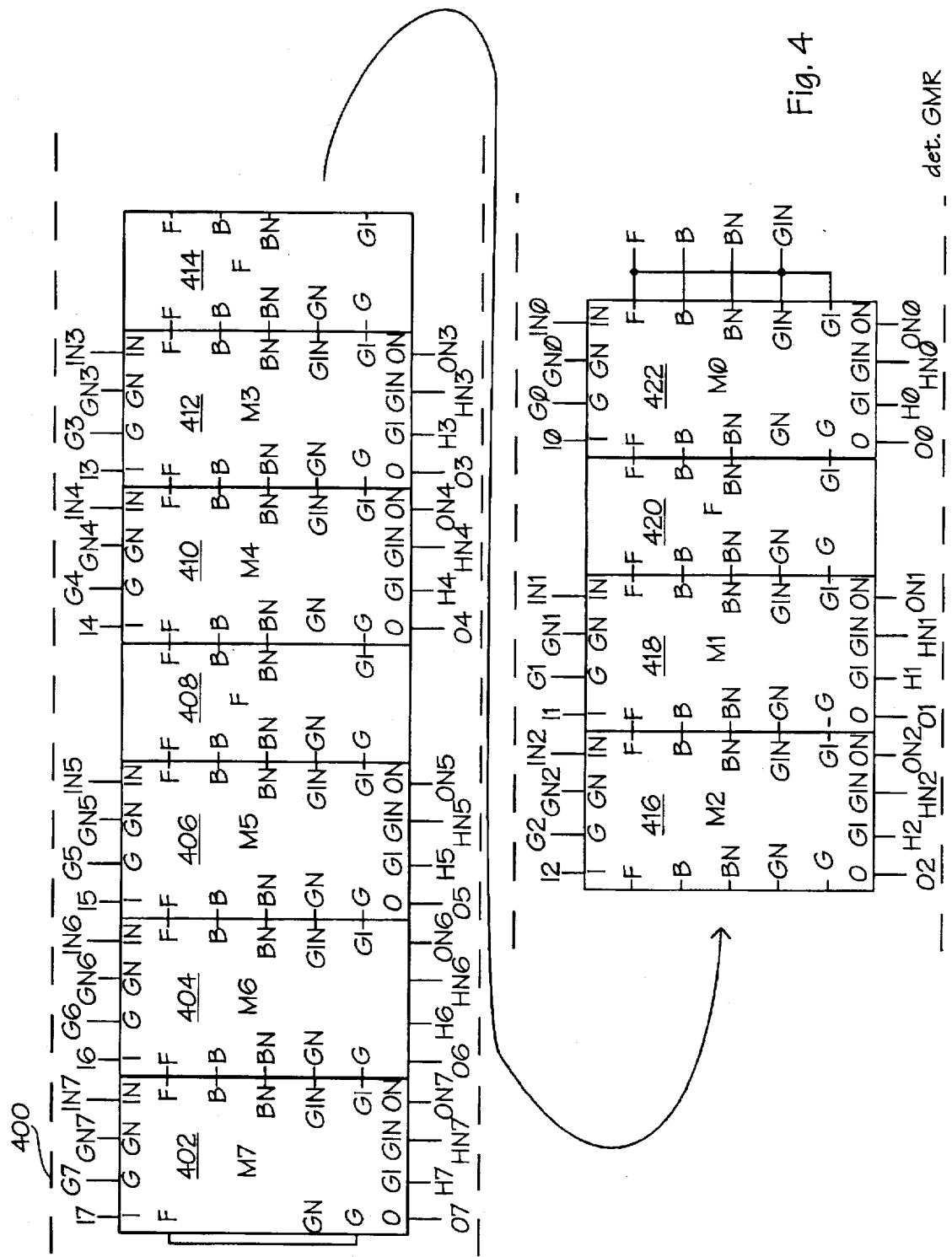
FIG. 4 illustrates a detailed schematic diagram of the block GMR.

A detailed schematic of a block GMR which includes eight M blocks 300 and 3 F blocks 302 is illustrated in FIG. 4. The M0 block 422 is coupled to the F block 420. The F block 420 is coupled to the M1 block 418. The M1 block 418 is coupled to the M2 block 416. The M2 block 416 is coupled to the F block 414. The F block 414 is coupled to the M3 block 412. The M3 block 412 is coupled to the M4 block 410. The M4 block 410 is coupled to the F block 408. The F block 408 is coupled to the M5 block 406. The M5 block 406 is coupled to the M6 block 404. The M6 block 404 is coupled to the M7 block 402. The F signal, the B signal line, the BN signal line, the GI signal line and the GIN signal line are all input into the M0 block 422 and then passed through the remainder of the blocks in the block GMR. The F signal and the G signal are output of the M7 block 402.

The I signal, the IN signal, the G signal, the GN signal, the O signal, the ON signal, the GI signal and the GIN signal are all eight bit signals. Each bit 0–7 of the I signal, the IN signal, the G signal, the GN signal, the O signal, the ON signal, the GI signal and the GIN signal are coupled to the appropriate M block 0–7.

Figure 5:
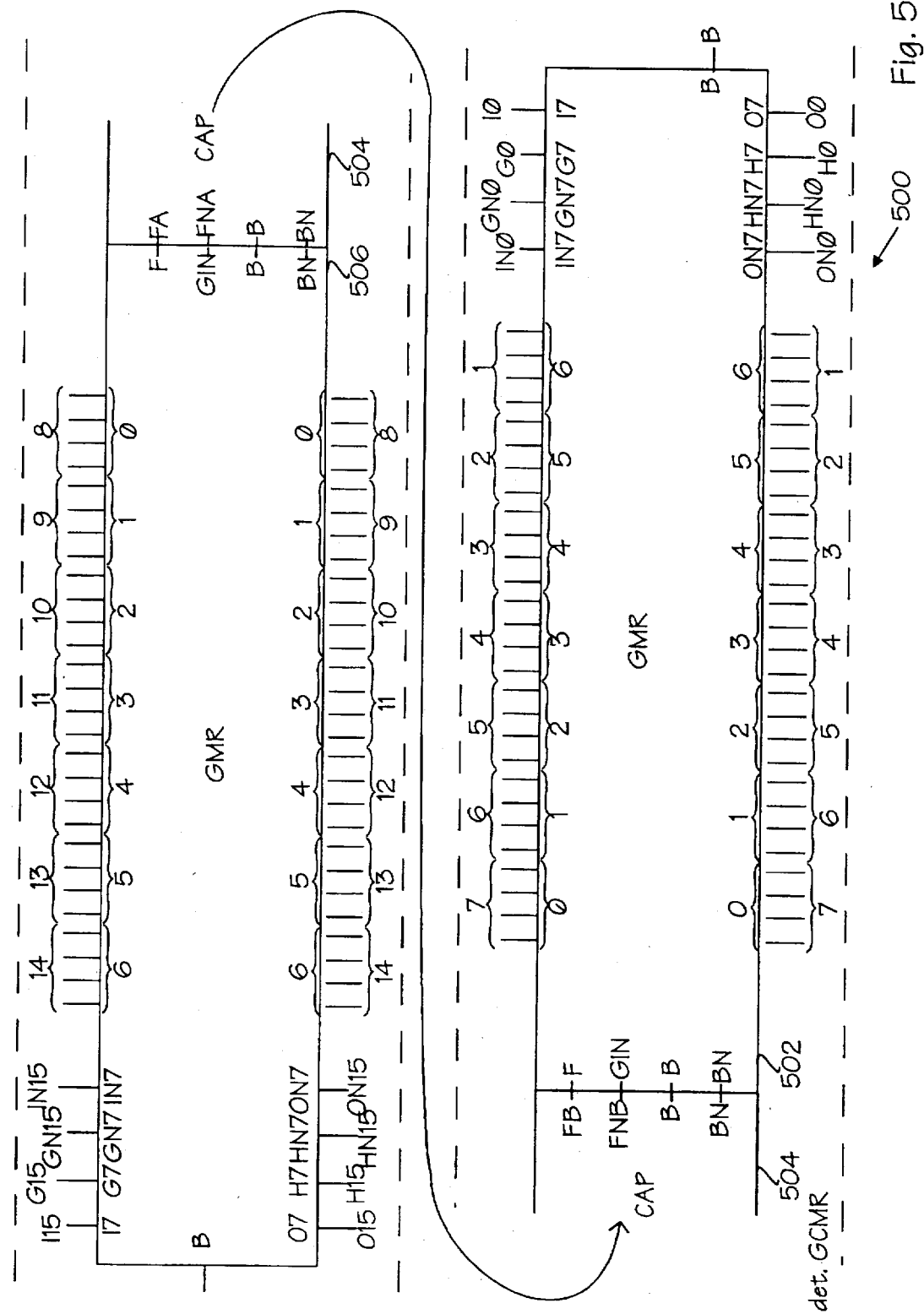
FIG. 5 illustrates a detailed schematic diagram of the block GCMR.

FIG. 5 illustrates a detailed schematic of the block GCMR 500 which includes two GMR blocks 502 and 506 and one CAP block 504. The first GMR block 502 is coupled to bits 0 through 7 of the I signal, the IN signal, the G signal, the GN signal, the O signal, the ON signal, the GI signal and the GIN signal. The second GMR block 506 is coupled to bits 8–15 of the I signal, the IN signal, the G signal, the GN signal, the O signal, the ON signal, the GI signal and the GIN signal.

Figure 6:
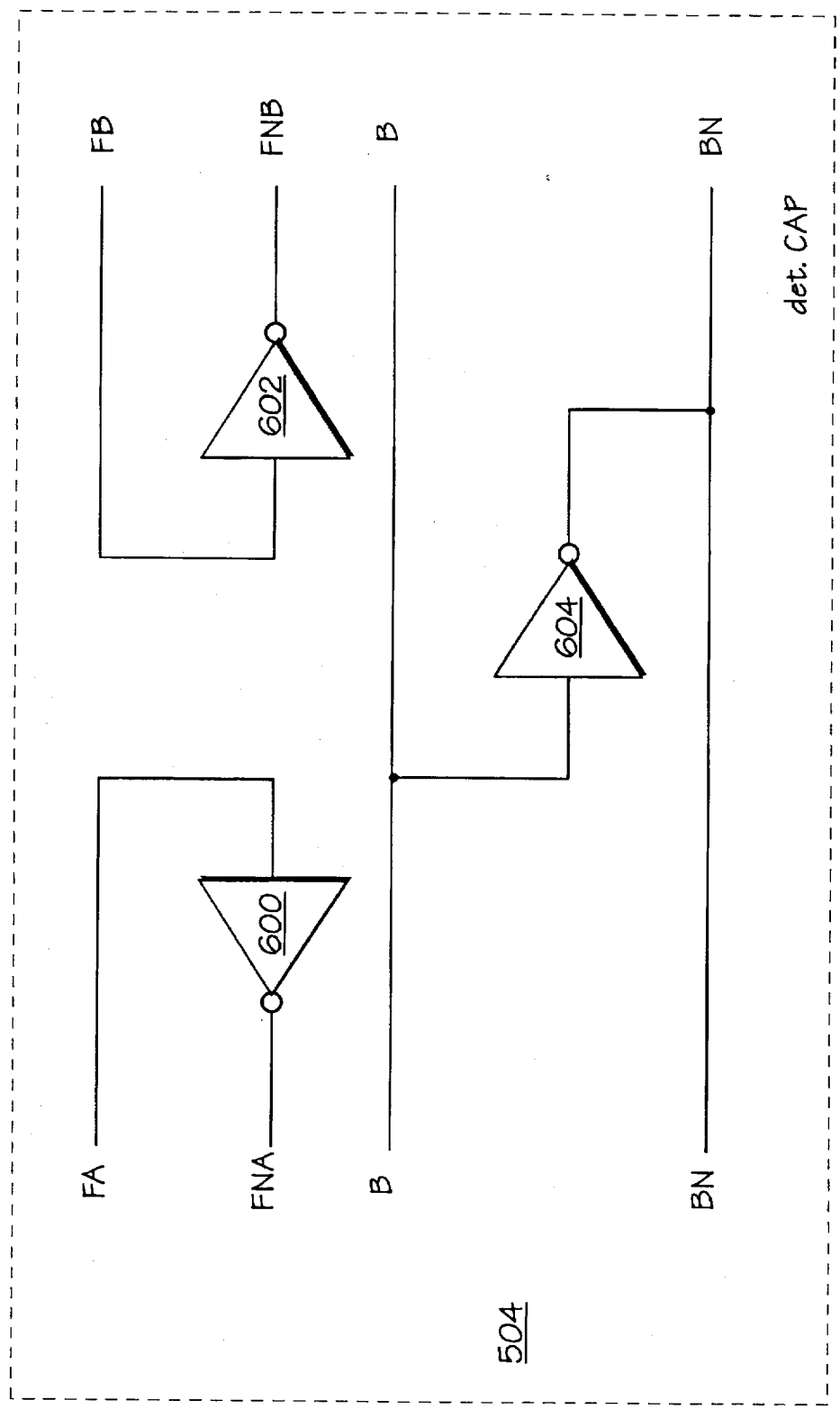
FIG. 6 illustrates a detailed schematic diagram of the fundamental block CAP.

FIG. 6 illustrates a detailed schematic of the block CAP 504 coupled in between the two GMR blocks 502 and 506 within the GCMR block 500. The signal FB is coupled to the F signal line of the first GMR block 502 and to the input of the inverter 602. The output of the inverter 602 is coupled to the signal FNB and to the GIN signal of the first GMR block 502. The B signal is coupled to the first and second GMR blocks 502 and 506 and to the input of the inverter 604. The output of the inverter 604 is coupled to the BN signal and to the first and second GMR blocks 502 and 506. The signal FA is coupled to the F signal line of the second GMR block 506 and to the input of the inverter 600. The output of the inverter 600 is coupled to the signal FNA and to the GIN signal of the second GMR block 506.

Figure 7A:
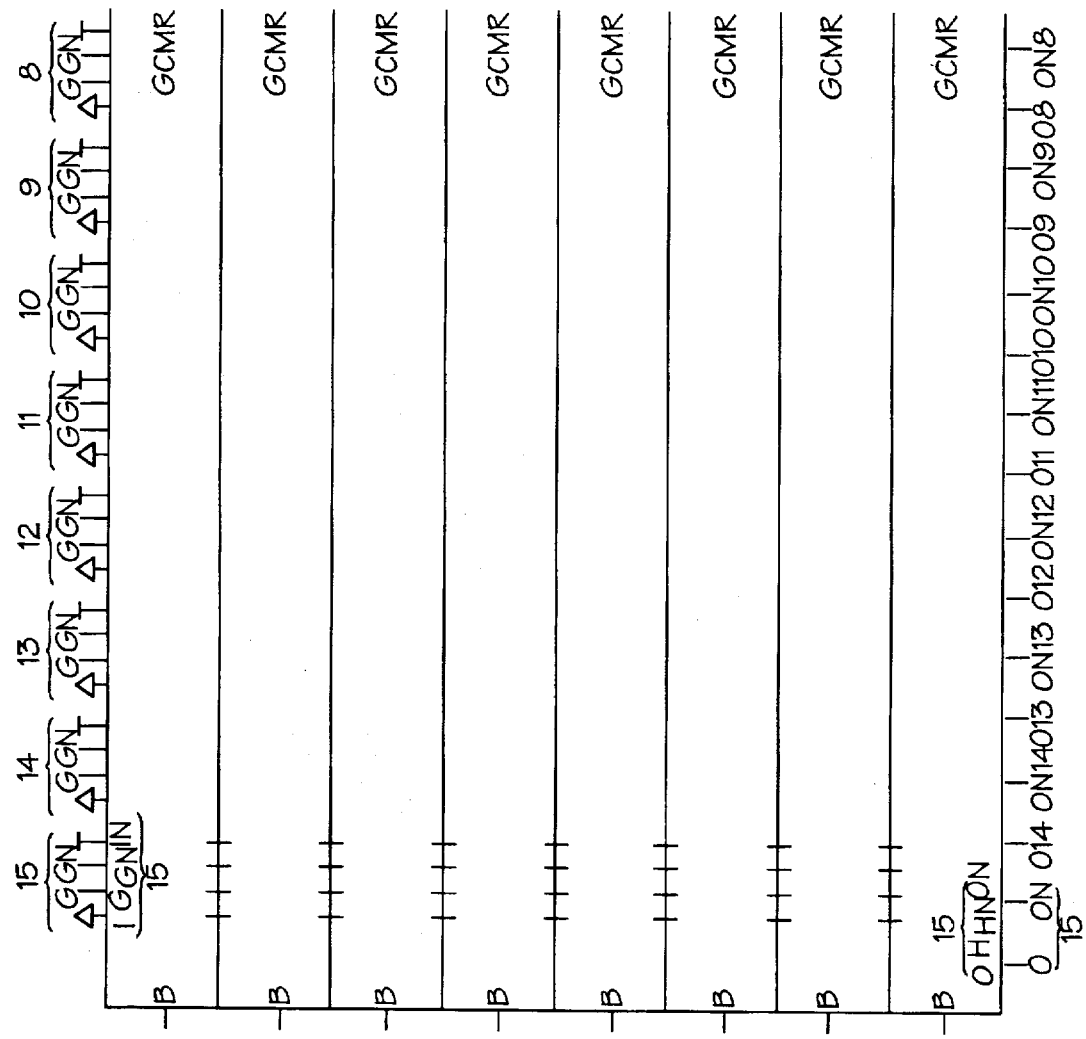
FIG. 7 illustrates a detailed schematic diagram of the block GHMR.
Figure 7B:
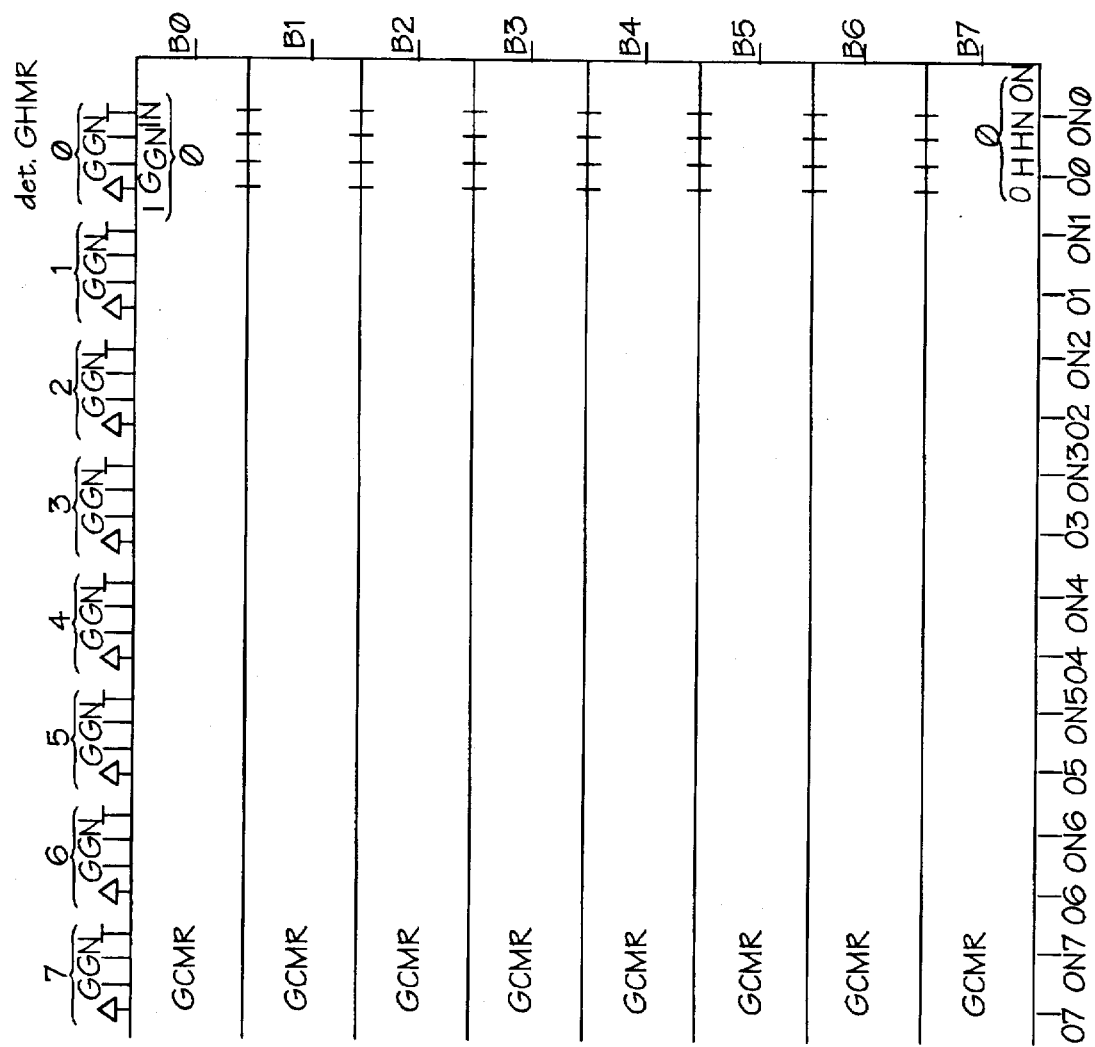

FIG. 7 illustrates a detailed schematic of the block GHMR made up of eight GCMR blocks 500 as illustrated in FIG. 5 stacked on top of each other to form the multiplier block GHMR.

Figure 8:
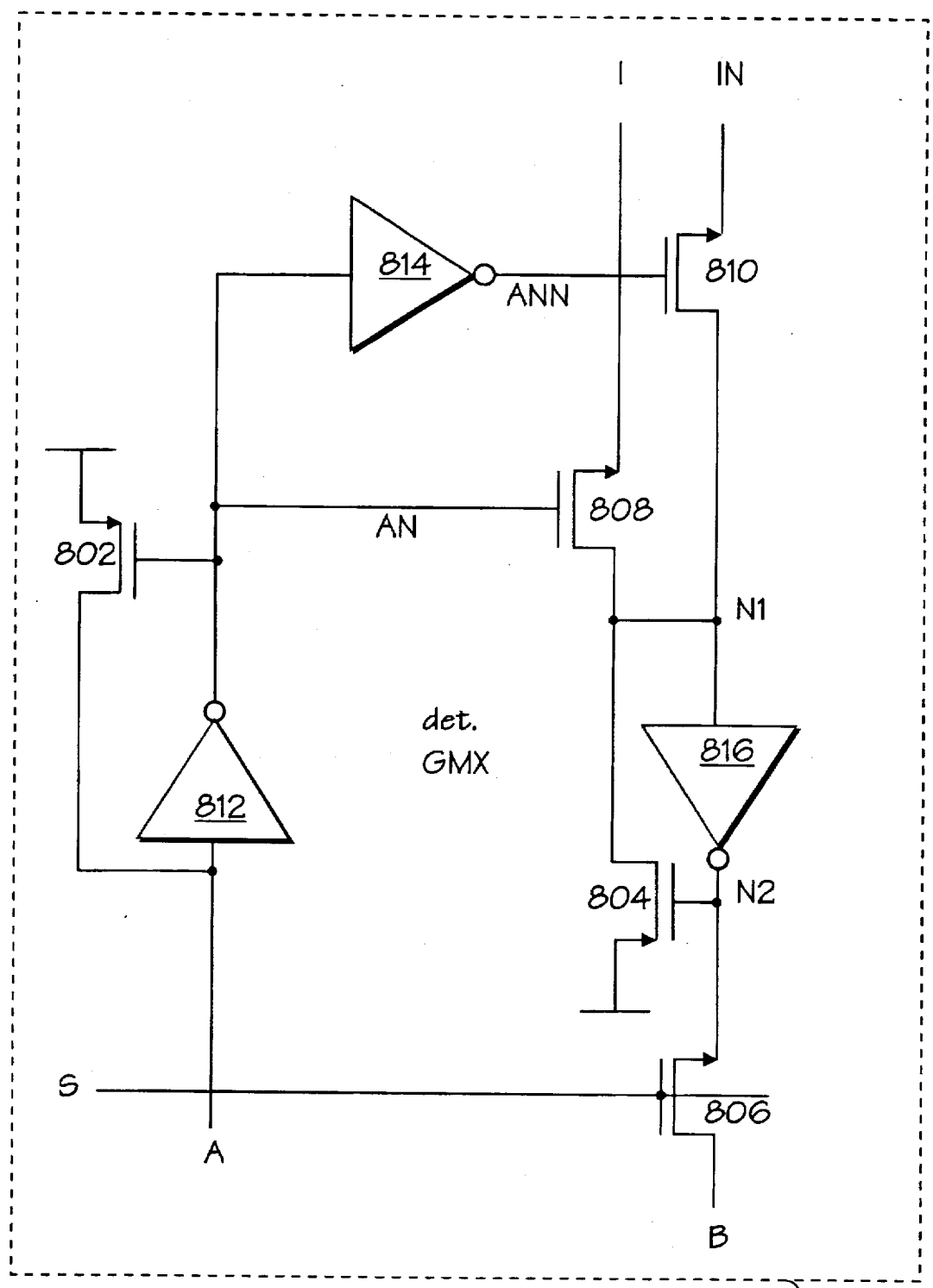
FIG. 8 illustrates a detailed schematic diagram of the fundamental block GMX.

FIG. 8 illustrates a detailed schematic of the fundamental block GMX which is used to construct sections of the general multiplier 20 as will be discussed below. The signal line S, the signal line I and its inverse, the signal line IN, the signal line A and the signal line B are all coupled to the block GMX 800. The signal line A is coupled to the input of the inverter 812 and to the drain of the transistor 802. The signal line B is coupled to the drain of the transistor 806. The signal line S is coupled to the gate of the transistor 806. The output AN of the inverter 812 is coupled to the gate of the transistor 802, to the gate of the transistor 808 and to the input of the inverter 814. The source of the transistor 802 is coupled to ground. The output of the inverter 814 is coupled to the gate of the transistor 810. The signal line I is coupled to the source of the transistor 808. The signal line IN is coupled to the source of the transistor 810. The drain of the transistor 810 is coupled to the drain of the transistor 808, to the input of the inverter 816 and to the drain of the transistor 804. The output of the inverter 816 is coupled to the gate of the transistor 804 and to the source of the transistor 806.

Figure 9:
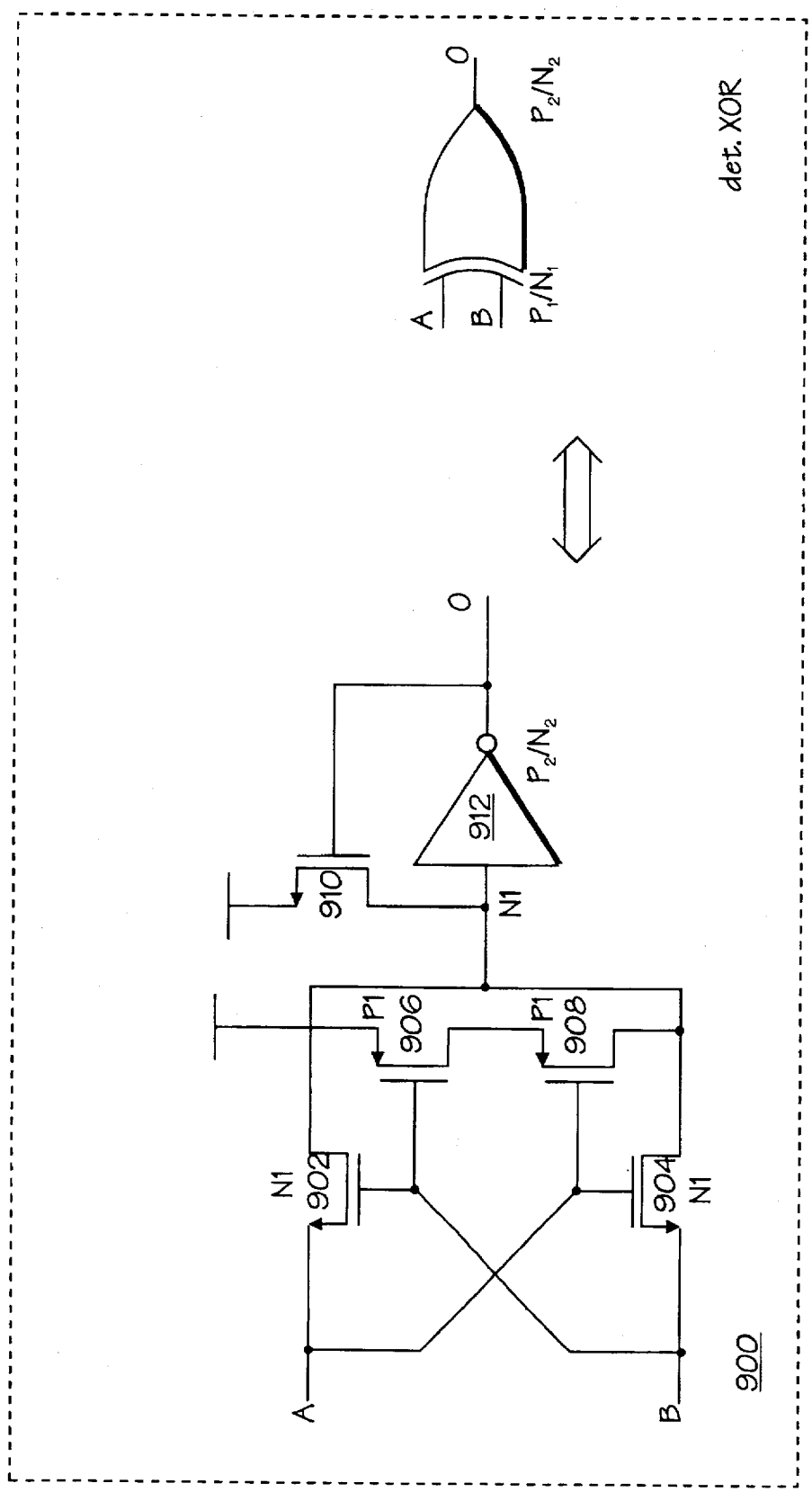
FIG. 9 illustrates a detailed schematic diagram of the fundamental block XOR.
Figure 10:
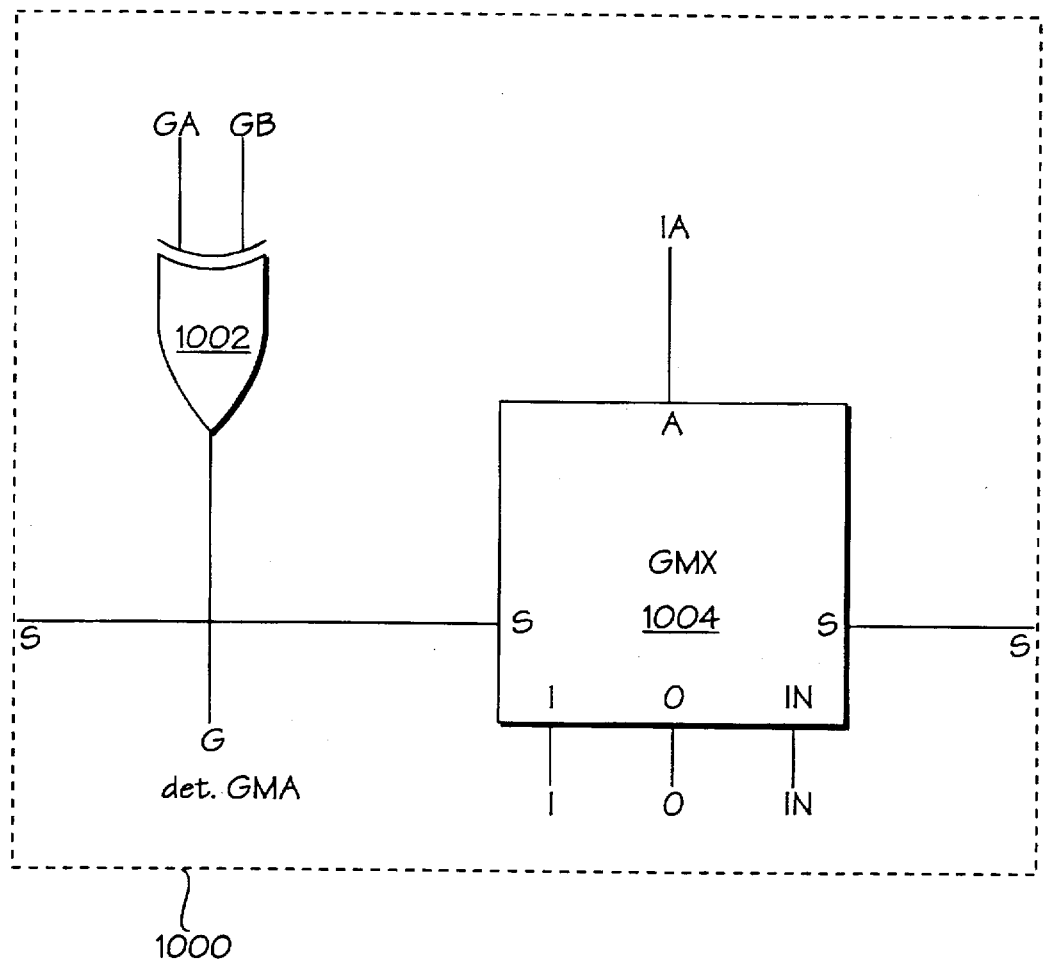
FIG. 10 illustrates a detailed schematic diagram of the fundamental block GMA.

FIG. 9 illustrates a detailed schematic of the fundamental block XOR 900 which is used to build the GMA block illustrated in FIG. 10. The block XOR 900 receives the signal lines A and B as inputs and outputs the exclusive OR of the inputs as the signal line O. The signal line A is coupled to the source of the transistor 902, to the gate of the transistor 904 and to the gate of the transistor 908. The signal line B is coupled to the source of the transistor 904, to the gate of the transistor 902 and to the gate of the transistor 906. The source of the transistor 906 is coupled to ground. The drain of the transistor 902 is coupled to the drain of the transistor 904, to the drain of the transistor 906, to the drain of the transistor 910 and to the input of the inverter 912. The drain of the transistor 908 is coupled to the source of the transistor 906. The source of the transistor 910 is coupled to ground. The gate of the transistor 910 is coupled to the output of the inverter 912 and to the signal line O as the output of the block XOR 900.

FIG. 10 illustrates a detailed schematic of the fundamental block GMA which is used to build sections of the general multiplier 20 as will be discussed below. The block GMA is made up of the block GMX 800, as illustrated in FIG. 8, and the block XOR 900, as illustrated in FIG. 9. The signal lines GA and GB are coupled as inputs to the block XOR 1002. The signal G is coupled as the output of the block XOR 1002. The signal lines IA, I, IN, O and S are coupled to the block GMX 1004.

Figure 11:
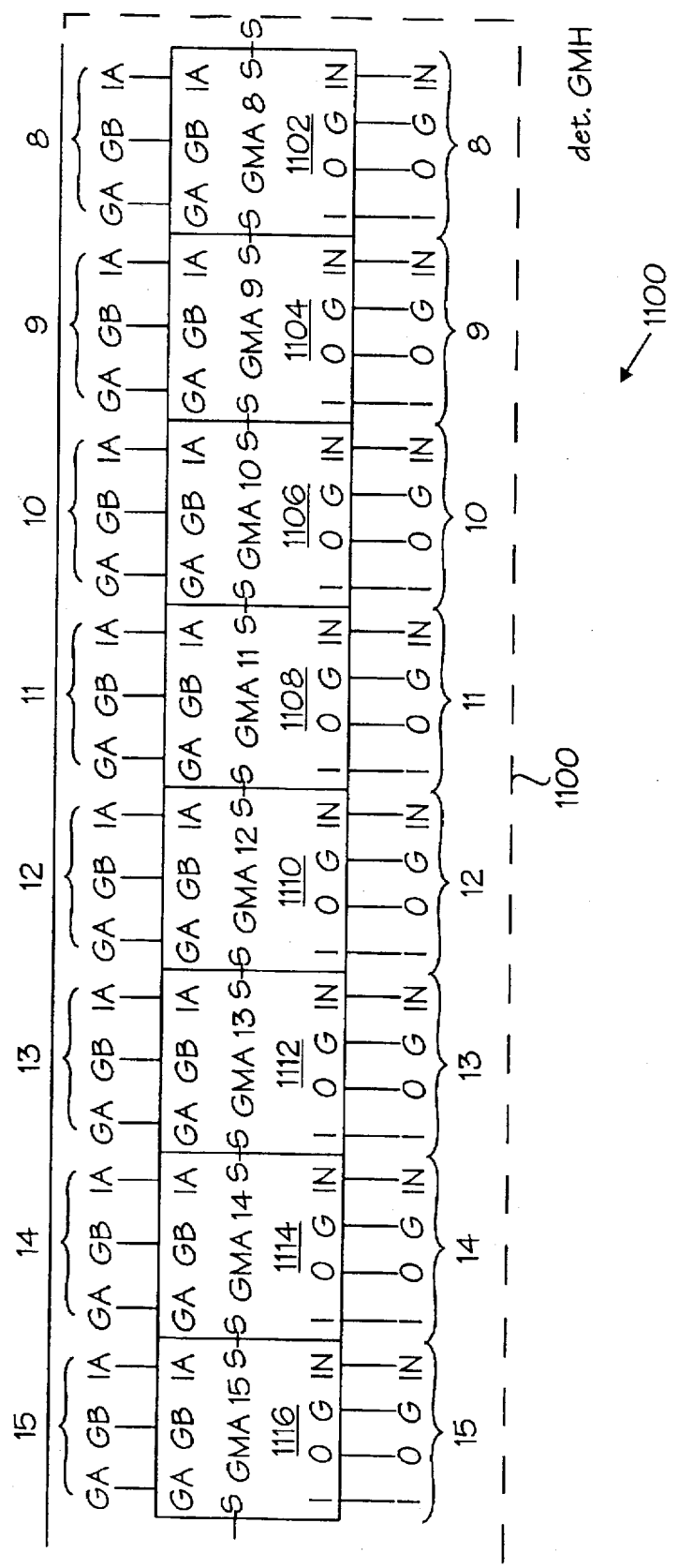
FIG. 11 illustrates a detailed schematic diagram of the block GMH.

FIG. 11 illustrates a detailed schematic of the block GMH which includes eight GMA blocks 1000, as illustrated in FIG. 10, coupled together. The block GMH 1100 includes the blocks GMA8–GMA15. The block GMA8 1102 is coupled to receive the signal S which is passed to the remainder of the blocks in the block GMH 1100. The block GMA8 1102 is also coupled to the block GMA9 1104. The block GMA9 1104 is coupled to the block GMA10 1106. The block GMA10 1106 is coupled to the block GMA11 1108. The block GMA11 1108 is coupled to the block GMA12 1110. The block GMA12 1110 is coupled to the block GMA13 1112. The block GMA13 1112 is coupled to the block GMA14 1114. The block GMA14 1114 is coupled to the block GMA15 1116.

The upper bits 8–15 of the signal GA correspond to the signal A coupled to the signal lines 30 as illustrated in FIG. 2 and are coupled to the appropriate GMA block GMA8–GMA15. The upper bits 8–15 of the signal GB correspond to the signal C coupled to the signal lines 34 as illustrated in FIG. 2 and are coupled to the appropriate GMA block GMA8–GMA15. The upper bits 8–15 of the signals G, IA, I, IN and O are coupled to the appropriate GMA block GMA8–GMA15.

Figure 12:
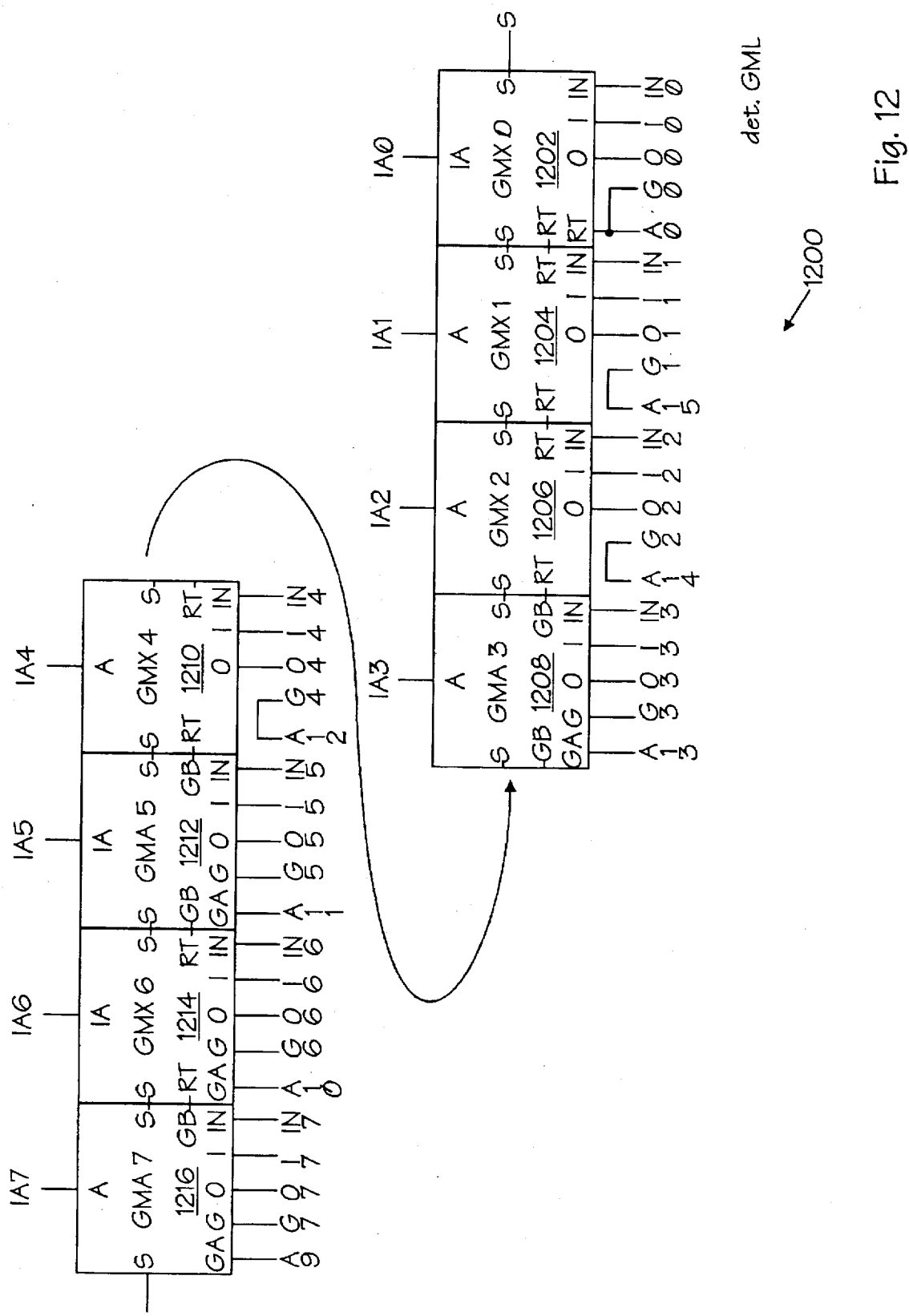
FIG. 12 illustrates a detailed schematic diagram of the block GML.

FIG. 12 illustrates a detailed schematic diagram of the block GML which includes five blocks GMX 800, as illustrated in FIG. 8 and three blocks GMA 1000, as illustrated in FIG. 10 coupled together. The block GMX0 1202 is coupled to receive the signal S which is passed to the remainder of the blocks in the block GML 1200. The block GMX0 1202 is coupled to the block GMX1 1204. The block GMX1 1204 is coupled to the block GMX2 1206. The block GMX2 1206 is coupled to the block GMA3 1208. The block GMA3 1208 is coupled to the block GMX4 1210. The block GMX4 1210 is coupled to the block GMA5 1212. The block GMA5 1212 is coupled to the block GMX6 1214. The block GMX6 1214 is coupled to the block GMA7 1216.

The lower bits 0–7 of the signal GA correspond to the signal B coupled to the signal lines 32 as illustrated in FIG. 2 and are coupled to the appropriate block 0–7. The lower bits 0–7 of the signal GB correspond to the signal D coupled to the signal lines 36 as illustrated in FIG. 2 and are coupled to the appropriate block 0–7. The lower bits 0–7 of the signals G, IA, I, IN and O are coupled to the appropriate one of the blocks 0–7.

Figure 13A:
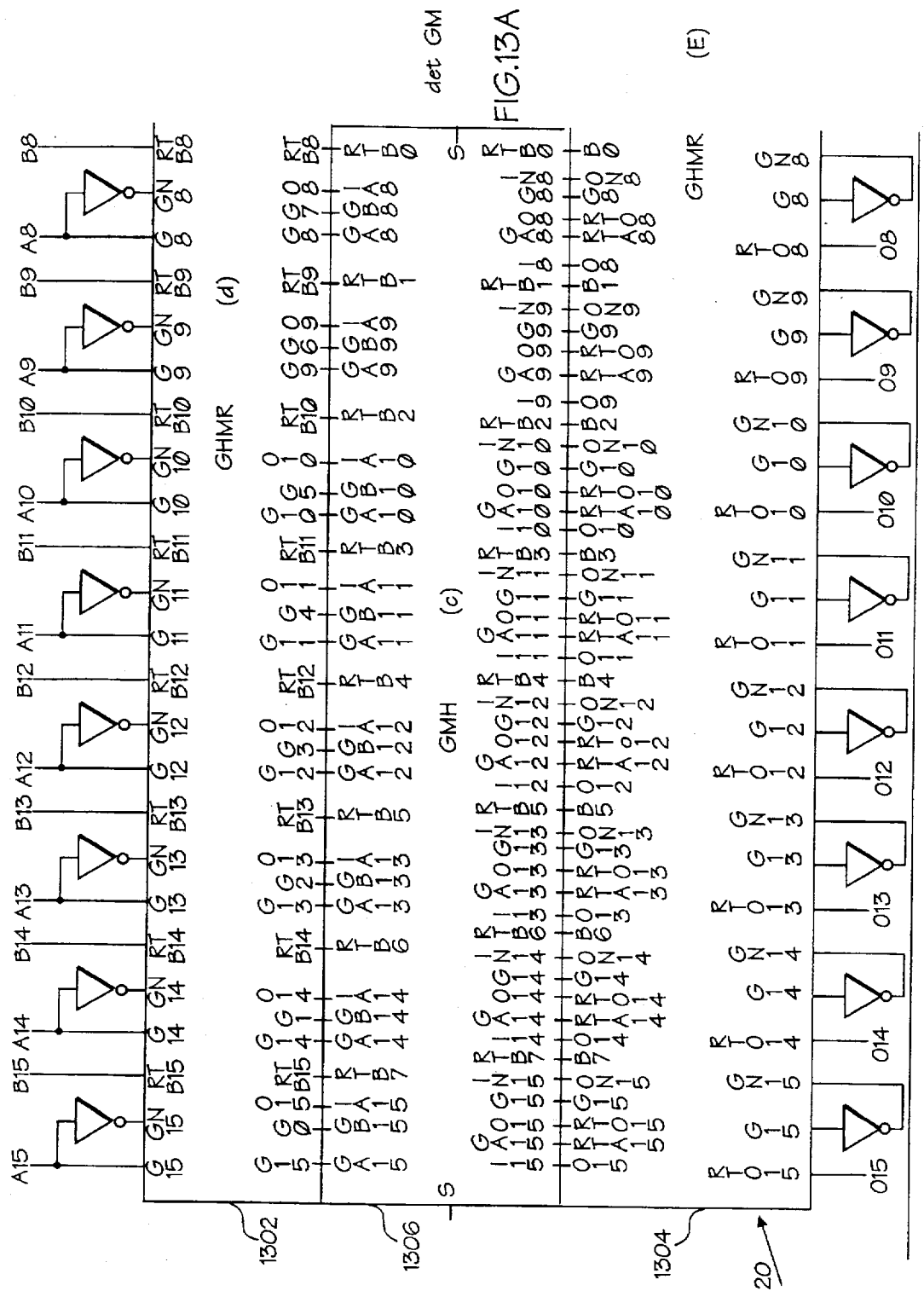
FIG. 13 illustrates a detailed schematic diagram of the general multiplier of the present invention.
Figure 13B:
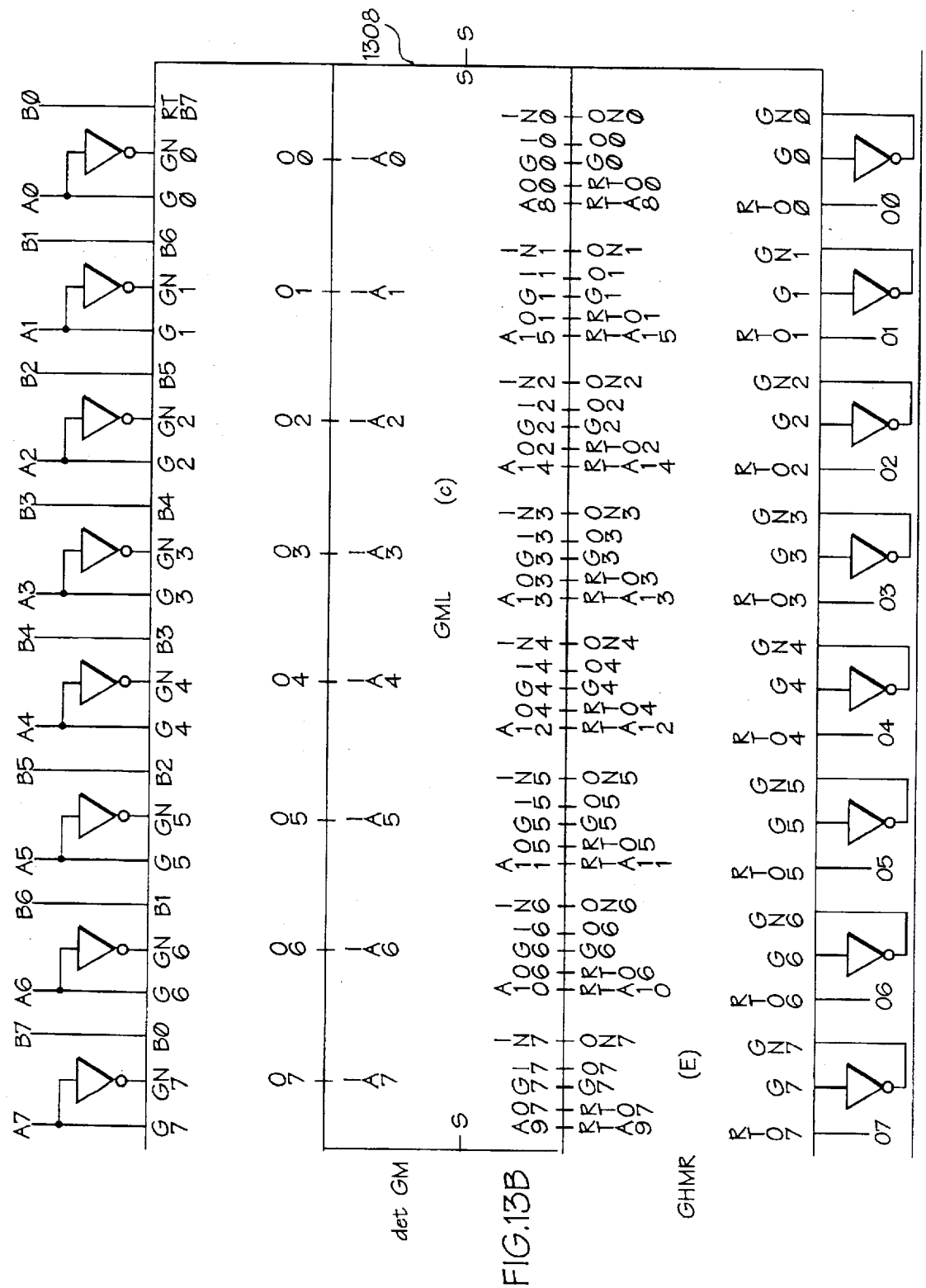

FIG. 13 illustrates a detailed schematic diagram of the general multiplier 20 which was illustrated in FIG. 2. The block GHMR 1302 implements the two multiplier blocks 22 and 26 of the general multiplier 20. The block GHMR 1304 implements the two multiplier blocks 24 and 28 of the general multiplier 20. The block GMH 1306 implements the block GMH 38 of the general multiplier 20. The block GML 1308 implements the block GML 40 of the general multiplier 20.

Figure 14:
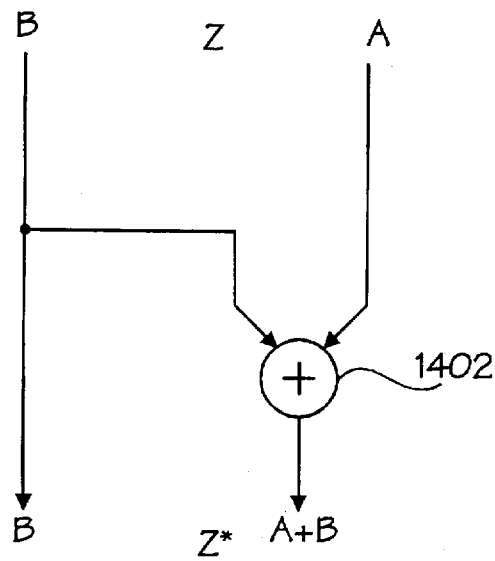
FIG. 14 illustrates a block diagram of the conjugate circuit according to the present invention.

FIG. 14 illustrates a block diagram of a hardware implementation of the conjugate circuit representing by the equation (13). The signal A is added to the signal B by the adder 1402. The signal B is also multiplied by a constant α and is then added to (A+B) to obtain the conjugate Z*.

Figure 15:
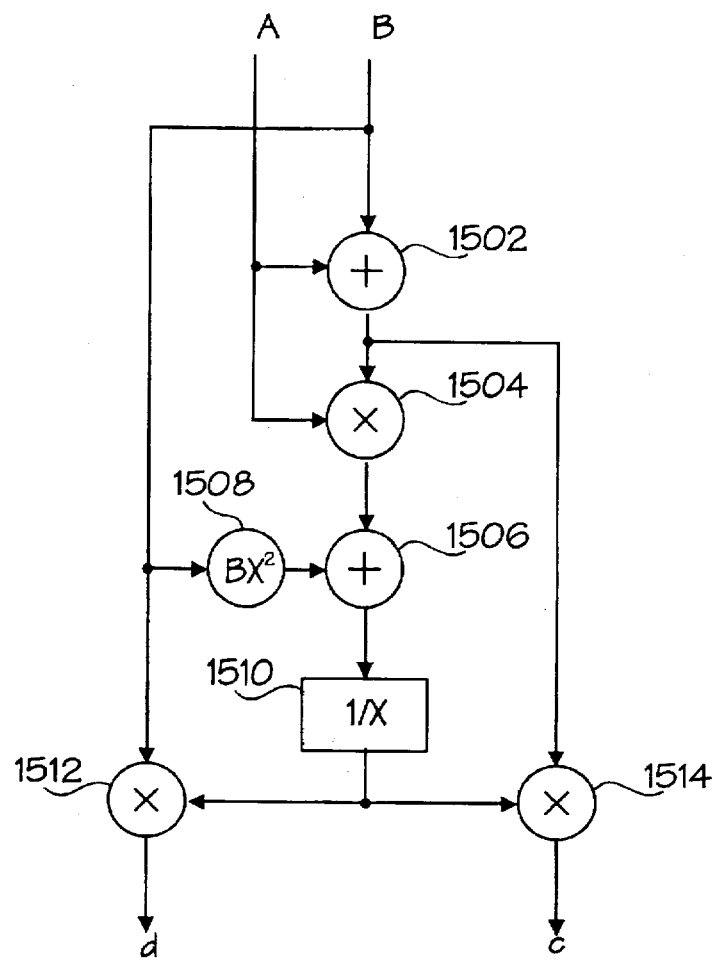
FIG. 15 illustrates a block diagram of the inverse circuit according to the present invention.

FIG. 15 illustrates a block diagram of a hardware implementation of the inverse circuit. The circuit of FIG. 15 implements the following equation:

$$\frac{1}{\alpha A + B} = \alpha C + D \qquad (19)$$

The signal A is added to the signal B by the adder 1502. The output of the adder 1502 is then multiplied by the signal A by the multiplier 1504 and input into the multiplier 1514. The output of the multiplier 1504 is then input into the adder 1506. The signal B is squared by the squaring circuit 1508. The output of the squaring circuit 1508 is added to the output of the multiplier 1504 by the adder 1506. The output of the adder 1506 is inverted by the inverse circuit 1510. The output of the inverse circuit 1510 is multiplied by the signal B by the multiplier 1512. The output of the multiplier 1512 is the signal D. The output of the inverse circuit 1510 is multiplied by the output of the adder 1502 by the multiplier 1514. The output of the multiplier 1514 is the signal C.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

I claim:

1. A method of controlling errors in an electronically communicated digital data message by performing at least one of a plurality of predetermined arithmetic operations on the data message in one or more of a plurality of subfields $GF(2^{p_i})$ of a finite field $GF(2^n)$, comprising steps of:

a. factoring a composite number n into a set of factors $p_i$ wherein the composite number n is a number of bits of each element in the finite field $GF(2^n)$;

b. forming a plurality of primitive polynomials $F_i$ wherein each primitive polynomial is of a degree equal to $p_i$ and defines a subfield $GF(2^{p_i})$ of the finite field $GF(2^n)$; and c. performing at least one of the plurality of predetermined arithmetic operations on the data message by utilizing an arithmetic circuit coupled to receive the data message, wherein the arithmetic operation is performed in one or more of the plurality of subfields $GF(2^{p_i})$ of the finite field $GF(2^n)$.

2. The method as claimed in claim 1 wherein one of the plurality of primitive polynomials is a primitive polynomial $F_1$ used to represent an extension field $GF(2)$.

3. The method as claimed in claim 1 wherein the plurality of primitive polynomials includes one or more quadratic polynomials and one or more non-quadratic polynomials.

4. The method as claimed in claim 3 wherein the plurality of primitive polynomials includes a normalized polynomial having the form: $x^2+x+\beta=0$.

5. The method as claimed in claim 1 wherein the plurality of primitive polynomials includes only quadratic polynomials.

6. The method as claimed in claim 5 wherein the plurality of primitive polynomials includes a normalized polynomial $x^2+x+\beta=0$.

7. The method as claimed in claim 1 wherein the plurality of primitive polynomials includes only non-quadratic polynomials.

8. An apparatus for controlling errors in an electronically communicated digital data message by performing at least one of a plurality of predetermined arithmetic operations on the data message in one or more of a plurality of subfields $GF(2^{p_i})$ of a finite field $GF(2^n)$, comprising:

an arithmetic circuit for performing at least one of the plurality of predetermined arithmetic operations on the data message, wherein the arithmetic operation is performed in one or more of the plurality of subfields $GF(2^{p_i})$ of the finite field $GF(2^n)$ and wherein each subfield $GF(2^{p_i})$ of the plurality of subfields is defined by a primitive polynomial $F_i$ of a degree equal to a factor $p_i$ of a number of bits of each element in the finite field $GF(2^n)$.

9. The apparatus as claimed in claim 8 wherein one of the plurality of primitive polynomials is a primitive polynomial $F_1$ used to represent an extension field $GF(2)$.

10. The apparatus as claimed in claim 8 wherein the plurality of primitive polynomials includes one or more quadratic polynomials and one or more non-quadratic polynomials.

11. The apparatus as claimed in claim 10 wherein the plurality of primitive polynomials includes a normalized polynomial $x^2+x+\beta=0$.

12. The apparatus as claimed in claim 8 wherein the plurality of primitive polynomials includes only quadratic polynomials.

13. The apparatus as claimed in claim 8 wherein the plurality of primitive polynomials includes only non-quadratic polynomials.

14. The apparatus as claimed in claim 8 wherein the arithmetic operation is a multiplication operation.

15. The apparatus as claimed in claim 14 wherein the multiplication operation is implemented using an equation $$(\alpha A+B)(\alpha C+D)=\alpha(AD+BC+AC)+(BD+AC\beta)=\alpha X+Y.$$

16. The apparatus as claimed in claim 14 wherein the multiplication operation is implemented using an equation $$(\alpha A+B)(\alpha C+D)=(X+Y)+\alpha(X+Z).$$

17. The apparatus as claimed in claim 8 wherein the arithmetic operation is a division operation.

18. The apparatus as claimed in claim 8 wherein the arithmetic operation is an inverse operation.

19. The apparatus as claimed in claim 8 wherein the arithmetic operation is a square root operation.

20. The apparatus as claimed in claim 8 wherein the arithmetic operation is a conjugate operation.

21. The apparatus as claimed in claim 8 wherein the arithmetic operation is a cube root operation.

22. The apparatus as claimed in claim 8 wherein the arithmetic operation is a discrete logarithm operation.

23. A method controlling errors in an electronically communicated digital data message by performing at least one of a plurality of arithmetic operations on the data message in one or more of a plurality of subfields $GF(2^{p_i})$ of a finite field $GF(2^n)$, comprising steps of:

a. setting a number of bits in the field, n, equal to $\Pi p_i$, a composite number, where $p_i$ is a set of factors of the number of bits in the field;

b. forming a primitive polynomial $F_1$ over a finite field $GF(2)$ used to represent a $p_1^{th}$ extension field of the finite field $GF(2)$;

c. forming a primitive polynomial $F_2$ over a finite field $GF(2^{p_i})$ used to represent a $p_2^{th}$ extension field of the finite field $GF(2^{p_i})$;

d. repeating step c for all factors, $p_i$, of the number of bits in the field, n, until a desired finite field $GF(2^n)$ is constructed; and e. providing an arithmetic circuit for performing at least one of the plurality of arithmetic operations on the data message in one or more of the plurality of subfields $GF(2^{p_i})$ of the finite field $GF(2^n)$.

24. The method according to claim 23 wherein the set of factors of the number of bits in the field includes a factor that is repeated.

25. The method as claimed in claim 23 wherein the plurality of primitive polynomials includes one or more quadratic polynomials and one or more non-quadratic polynomials.

26. The method as claimed in claim 25 wherein the plurality of primitive polynomials includes a normalized polynomial having the form: $x^2+x+\beta=0$.

27. The method as claimed in claim 23 wherein the plurality of primitive polynomials includes only quadratic polynomials.

28. The method as claimed in claim 27 wherein the plurality of primitive polynomials includes a normalized polynomial $x^2+x+\beta=0$.

29. The method as claimed in claim 23 wherein the plurality of primitive polynomials includes only non-quadratic polynomials.

30. An apparatus for controlling errors in an electronically communicated digital data message by performing at least one of a plurality of arithmetic operations on the data message in one or more of a plurality of subfields $GF(2^{p_i})$ of a finite field $GF(2^n)$ comprising:

an arithmetic circuit wherein the arithmetic circuit performs at least one of the plurality of arithmetic operations on the data message in one or more of the plurality of subfields $GF(2^{p_i})$ of the finite field $GF(2^n)$ wherein a first subfield $GF(2)$ of the plurality of subfields $GF(2^{p_i})$ is represented by a primitive polynomial $F_1$ having a degree of one, and wherein each of a plurality of successive primitive polynomials $F_i$ represents a successive one of the plurality of subfields $GF(2^{p_i})$ wherein each of the plurality of successive primitive polynomials $F_i$ corresponds to each factor pi of a number of bits in the field n.

31. The apparatus according to claim 30 wherein the plurality of primitive polynomials includes one or more quadratic polynomials and one or more non-quadratic polynomials.

32. The apparatus according to claim 30 wherein the plurality of primitive polynomials includes only quadratic polynomials.

33. The apparatus according to claim 30 wherein the plurality of primitive polynomials includes only non-quadratic polynomials.

34. The apparatus as claimed in claim 30 wherein the plurality of primitive polynomials includes a normalized polynomial $x^2+x+\beta=0$.

35. The apparatus as claimed in claim 30 wherein the arithmetic operation is a multiplication operation.

36. The apparatus as claimed in claim 35 wherein the multiplication operation is implemented using an equation $$(\alpha A+B)(\alpha C+D)=\alpha(AD+BC+AC)+(BD+AC\beta)=\alpha X+Y.$$

37. The apparatus as claimed in claim 35 wherein the multiplication operation is implemented using an equation $$(\alpha A+B)(\alpha C+D)=(X+Y)+\alpha(X+Z).$$

38. The apparatus as claimed in claim 30 wherein the arithmetic operation is an inverse operation.

39. The apparatus as claimed in claim 30 wherein the arithmetic operation is a square root operation.

40. The apparatus as claimed in claim 30 wherein the arithmetic operation is a conjugate operation.

41. The apparatus as claimed in claim 30 wherein the arithmetic operation is a discrete logarithm operation.

* * * * *

UNITED STATES PATENT AND TRADEMARK OFFICE
CERTIFICATE OF CORRECTION

PATENT NO. : 5,689,452

DATED : November 18, 1997

INVENTOR(S) : Kelly Cameron

It is certified that error appears in the above-identified patent and that said Letters Patent is hereby corrected as shown below:

In page 1, column 1, lines 13-14, delete "CCSDS Recommdation for Telemetry Channel Coding, CCSDS Secretariat, Communications and Data Systems Division, Code-TS, NASA, 1984";
line 20, delete "ISBM" and insert --ISBN--.

In page 1, column 2, line 7, delete "MTI" and insert --MIT--;
line 17, delete "of" and insert --to--.

In page 2, column 2, line 4, delete "711" and insert --717--.

In column 5, line 15, delete "plain" and insert --plane--.
In column 6, line 17, delete "A" and insert --Z--.

UNITED STATES PATENT AND TRADEMARK OFFICE
CERTIFICATE OF CORRECTION

PATENT NO. : 5,689,452

DATED : November 18, 1997

INVENTOR(S) : Kelly Cameron

It is certified that error appears in the above-identified patent and that said Letters Patent is hereby corrected as shown below:

In column 8, line 16, delete $$"(\alpha x_1 + x_0)^2 m^{+1} = 0\alpha + x_1 x_0 + x_0^2 + \beta x_1^2 \qquad (18)"$$

and insert $$--(\alpha x_1 + x_0)^{2^{m+1}} = 0\alpha + x_1 x_0 + x_0^2 + \beta x_1^2 \qquad (18)--.$$

In column 9, line 20, delete "line" and insert --line 34.--.

Signed and Sealed this

Twenty-eighth Day of April, 1998

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,689,452
DATED : November 18, 1997
INVENTOR(S) : Kelly Cameron

It is certified that error appears in the above-identified patent and that said Letters Patent is hereby corrected as shown below:

In Column 1, line 5, insert

--GOVERNMENT LICENSE RIGHTS

The U.S. Government has a paid-up license in this invention and the right in limited circumstances to require the patent owner to license others on reasonable terms as provided for by the terms of contract No. 93-48-008 awarded by NASA.-- as the first paragraph of the specification before "FIELD OF THE INVENTION."

Signed and Sealed this

Fifteenth Day of September, 1998

Attest:

BRUCE LEHMAN

Attesting Officer

Commissioner of Patents and Trademarks